US007830702B2

(12) United States Patent
Yerushalmi et al.

(10) Patent No.: US 7,830,702 B2
(45) Date of Patent: Nov. 9, 2010

(54) SYNTHETIC MOLECULAR SPRING DEVICE

(75) Inventors: Roie Yerushalmi, Moshav (IL); Avigdor Scherz, Rehovot (IL)

(73) Assignee: Yeda Research And Development Co. Ltd., Rehovot (IL)

( * ) Notice: Subject to any disclaimer, the term of this patent is extended or adjusted under 35 U.S.C. 154(b) by 1557 days.

(21) Appl. No.: 10/468,840

(22) PCT Filed: Mar. 12, 2002

(86) PCT No.: PCT/US02/07178

§ 371 (c)(1),
(2), (4) Date: Sep. 3, 2003

(87) PCT Pub. No.: WO02/073062

PCT Pub. Date: Sep. 19, 2002

(65) Prior Publication Data

US 2004/0096860 A1 May 20, 2004

Related U.S. Application Data

(60) Provisional application No. 60/274,635, filed on Mar. 12, 2001.

(51) Int. Cl.
*C07B 47/00* (2006.01)
*G11C 13/00* (2006.01)
(52) U.S. Cl. .................. 365/151; 365/106; 365/153; 365/173; 540/145
(58) Field of Classification Search ............... 365/151, 365/106, 153, 173; 540/145
See application file for complete search history.

(56) References Cited

U.S. PATENT DOCUMENTS

| 3,556,553 | A | 1/1971 | Kolbe |
| 4,412,675 | A | 11/1983 | Kawakubo |
| 4,588,638 | A | 5/1986 | Dolinar |
| 4,848,511 | A | 7/1989 | Ohyama et al. |
| 5,464,987 | A | 11/1995 | Ihara et al. |
| 5,900,405 | A | 5/1999 | Urry |
| 6,212,093 | B1 * | 4/2001 | Lindsey .................. 365/151 |
| 6,243,248 | B1 | 6/2001 | Gimzewski et al. |
| 6,324,091 | B1 | 11/2001 | Gryko et al. |
| 2003/0107927 | A1 | 6/2003 | Yerushalmi et al. |
| 2004/0011821 | A1 | 1/2004 | Petit |
| 2004/0096860 | A1 | 5/2004 | Yerushalmi et al. |
| 2008/0232156 | A1 | 9/2008 | Yerushalmi et al. |

FOREIGN PATENT DOCUMENTS

| EP | 1215613 | 6/2002 |
| EP | 1368579 | 12/2003 |
| WO | WO 99/40812 | 8/1999 |
| WO | WO 00/22101 | 4/2000 |
| WO | WO 00/44094 | 7/2000 |
| WO | WO 01/81446 | 1/2001 |
| WO | WO 01/44302 | 6/2001 |
| WO | WO 01/49984 | 7/2001 |
| WO | WO 02/073062 | 9/2002 |
| WO | WO 2004/011821 | 5/2004 |

OTHER PUBLICATIONS

Translation of Notice of Reason for Rejection Dated Dec. 5, 2008 From the Japanese Patent Office Re.: Application No. 2004-524034.
Office Action Dated Feb. 22, 2009 From the Israeli Patent Office Re.: Application No. 166566 and Its Translation Into English.
Kurzweil "The Drexler-Smalley Debate on Molecular Assembly", Kurzweilai.net, p. 1-15, 2003.
Bissell et al. "A Chemically and Electrochemically Switchable Molecular Shuttle", Nature, 369: 13-137, 1994.
Ballardini et al. "Molecular-Level Artificial Machines Based on Photoinduced Electron-Transfer Processes", Structure & Bonding, 99: 174-183, 2001.
Pease et al. "Computing at the Molecular Level", Structure & Bonding, 99: 224-227, 2001.
Asakawa et al. "Current/Voltage Characteristics of Monolayers of Redox-Switchable [2]Catenanes on Gold", Adv. Mater., 12(15): 1099-1102, 2000.
Willner "Layered Molecular Optoelectronic Assemblies", J. Mater. Chem., 8: 2543-2556, 1998.
Chia et al. "Working Supramolecular Machines Trapped in Glass and Mounted on a Film Surface", Angew. Chemie Int. Ed., 40(13): 2447-2451, 2001.
Balzani et al. "Photochemistry and Photophysics of Ru(II)-Polypyridine Complexes in the Bologna Group. From Early Studies to Recent Developments", Coordination Chemistry Reviews, 211: 97-115, 2001.
Gomez-Lopes et al. "The Art and Science of Self-Assembling Molecular Machines", Nanotechnology, 7: 183-192, 1996.
Cotton et al. "Supramolecular Arrays Based on Dimetal Building Units", Accounts of Chemical Research, 34(10): 759-771, 2001.
Feringa "In Control of Motion: From Molecular Switches to Molecular Motors", Acc. Chem. Res., 34(6): 504-513, 2001.

(Continued)

*Primary Examiner*—James O. Wilson
*Assistant Examiner*—Paul V. Ward

(57) ABSTRACT

Synthetic molecular spring device featuring: (a) a synthetic molecular assembly, SMA, each scalable chemical module including: (i) at least one atom, M, (ii) at least one complexing group, CG, complexed to an atom, M, (iii) at least one axial ligand, AL, reversibly physicochemically paired with at least one atom, M, complexed to a complexing group, CG, (iv) at least one substantially elastic molecular linker, ML, having body and two ends with at least one chemically bonded to another component of SMA; (b) activating mechanism, AM, operatively directed to an atom-axial ligand pair, whereby following activating mechanism, AM, sending activating signal, AS/AS', to an atom-axial ligand pair for physicochemically modifying the atom-axial ligand pair, there is activating at least one cycle of spring-type elastic reversible transitions between contracted and expanded linear conformational states of molecular linker, ML. Optionally includes (v) chemical connectors, CC, and/or, (vi) binding sites, BS.

54 Claims, 8 Drawing Sheets

OTHER PUBLICATIONS

Tuzun et al. "Dynamics of A Laser Driven Molecular Motor", Nanotechnology, 6: 52-63, 1995.
Venturi et al. "Electrochemistry of Coordination Compounds: An Extended View", Coordination Chemistry Reviews, 185-186: 233-256, 1999.
Seki et al. "Photoresponsive Monolayers on Water and Solid Surfaces", Supramolecular Science, 5(3-4): 373-377, 1998.
Nakash et al. "Structure-Activity Relationships in the Acceleration of a Hetero Diels-Alder Reaction by Metalloporphyrin Hosts", J. Org. Chem., 65: 7266-7271, 2000.
Kim et al. "Synthesis, Structure, and Modeling of a Cyclic Rhodium(III) Porphyrin Dimer With an Encapsulated 4,4-Bipyridine Ligand", Inorg. Chem., 38: 5178-5183, 1999.
Bampos et al. "Metalloporphyrin Oligomers With Collapsible Cavities: Characterisation and Recognition Properties of Individual Atropisomers", Chem. Eur. J., 4(2): 335-345, 1998.
Taylor et al. "Cooperative Self-Assembly of Double-Strand Conjugated Porphyrin Ladders", J. Am. Chem. Soc., 121: 11538-11545, 1999.
Buchler et al. "Oxidation and Reduction of Cerium(IV) Sandwich Complexes With Porphyrin Ligands Linked by Aliphatic Diether Bridges of Variable Chain Length", Eur. J. Inorg. Chem., p. 445-449, 1998.
Kelly "Progress Toward a Rationally Designed Molecular Motor", Acc. Chem. Res., 34: 514-522, 2001.
Collin et al. "Construction of One-Dimensional Multicomponent Molecular Arrays: Control of Electronic and Molecular Motions", Eur. J. Inorg. Chem., p. 1-14, 1998.
Nagata et al. "Synthesis and Optical Properties of Conformationally Constrained Trimeric and Pentameric Porphyrin Arrays", J. Am. Chem. Soc., 112: 3054-3059, 1990.
Funatsu et al. "Perpendicularly Arranged Ruthenium Porphyrin Dimers and Trimers", Inorg. Chem., 36: 1625-1635, 1997.
Schneider et al. "Phthalocyaninatoeisen mit Pyrazin als zweizaehnigem Brueckenliganden", Angew. Chem., 92(5): 391-393, 1980.
Collman et al. "Synthetic, Electrochemical, Optical, and Conductivity Studies of Coordination Polymers of Iron, Ruthenium, and Osmium Octaethylporphyrin", J. Am. Chem. Soc., 109: 4606-4614, 1987.
Kobel et al. "Bisaxially Coordinated (Phthalocyaninato) Ruthenium(II) Compounds", Inorg. Chem., 25: 103-107, 1986.
Grund et al. "Resonant Nonlinear Optical Properties of Spin-Cast Films of Soluble Oligomeric Bridged (Phthalocyaninato) Ruthenium(II) Complexes", J. Phys. Chem., 96: 7450-7454, 1992.
Hanack et al. "Synthesis and Properties of Conducting Bridged Macrocyclic Metal Complexes" Institut fuer Organische Chemie, Universitaet Tuebingen, Germany, p. 126, 1997.
Nakash et al. "Product-Induced Distortion of a Metalloporphyrin Host: Implications for Acceleration of Diels-Alder Reactions", J. Am. Chem. Soc., 122: 5286-5293, 2000.
Hannak et al. "An Organometallic B12-Rotaxane and a B12-Dimer, Relaxed and Loaded Forms of a 'Molecular Spring", J. Am. Chem. Soc., 119: 2313-2314, 1997.
Tanaka et al. "Clathrate Formation by and Self-Assembled Supramolecular Structures of a 'Molecular Spring'", Chem. Soc., Perkin Trans., 2: 2492-2497, 2000.
Noy et al. "Optical Absorption and Computational Studies of [Ni]-Bacteriochlorophyll-α. New Insight Into Charge Distribution Between Metal and Ligands", J. Am. Chem. Soc., 122: 3937-3944, 2000.
Tashiro et al. "A Cyclinc Dimer of Metalloporphyrin Forms a Highly Stable Inclusion Complex With C60", J. Am. Chem. Soc., 121: 9477-9478, 1999.
Lui et al. "Switchable Molecular Devices: From Rotaxanes to Nanoparticles", Structure and Bonding, 99: 141-145, 2001.
Amendola et al. "Molecuar Movements and Translocations Controlled by Transition Metals and Signaled by Light Emission", Structure and Bonding, 99: 80, 2001.
Jimenez et al. "Towards Synthetic Molecular Muscles: Contaction and Streching of a Linear Rotaxane Dimer", Angew. Chem. Int. Ed., 39(18): 3284-3287, 2000.
Mahadevan et al. "Motility Powered by Supramolecular Springs and Rachets", Science, 288: 95-99, 2000.
Feringa "In Control of Molecular Motion", Nature, 408: 151-154, 2000.
Otero et al. "Soft and Wet Conducting Polymers for Artificial Muscles", Adv. Mater., 10(6): 491-494, 1998.
Tashiro et al. "Metal Bisporphyrinate Double-Decker Complexes as Redox-Responsive Rotating Modules. Studies in Ligand Rotation Activities of the Reduced and Oxidized Forms Using Chirality as a Probe", J. Am. Chem. Soc., 122: 7921-7926, 2000.
Collin et al. "Shuttles and Muscles: Linear Molecular Machines Based on Transition Metals", Acc. Chem. Res., 34(6): 477-487, 2001.
Ashton et al. "Dual-Mode 'Co-Conformational' Switching in Catenanes Incorporating Bipyridinium and Dialkylammonium Recognition Sites", Chem. Eur., 7(16): 3482-3493, 2001.
Cardenas et al. "Synthesis, X-Ray Structure, and Electrochemical and Exited-State Properties of Multicomponent Made of a [Ru(Tpy)2]2+ Unit Covalently Linked to a [2]-Catenate Moiety. Controlling the Energy-Transfer Direction by Changing the Catenate Metal Ion", J. Am. Chem. Soc., 121: 5481-5488, 1999.
Amendola et al. "Molecular Events Switched by Transition Metals", Coordination Chemistry Reviews, 190-192: 649-669, 1999.
Asfari et al. "Molecular Machines", J. Inclusion Phenomena and Macrocyclic Chemistry, 36: 103-118, 2000.
Joachim et al. "An Electrochemical Amplifier Using a Single Molecule", Chemical Physics Letters, 265: 353-357, 1997.
Leigh et al. "A Quantum-Mechanical Description of Macrocyclic Ring Rotation in Benzylic Amide[2]Catenanes", Chem. Eur. J., 7(7): 1450-1454, 2001.
Amendola et al. "Molecular Machines Based on Metal Ion Translocation", Accounts of Chemical Research, 34(6): 488-493, 2001.
Balzani et al. "Artificial Molecular Machines", Angew. Chemie Int. Ed., 39: 3348-3391, 2000.
Brouwer et al. "Photoinduction of Fast, Reversible Translational Motion in a Hydrogen-Bonded Molecular Shuttle", Science, 291: 2124-2128, 2001.
Davis "Synthetic Molecular Motors", Nature, 401: 120-121, 1999.
Merkle "Molecular Building Blocks and Development Strategies for Molecular Nanotechnology", Nanotechnology, 11: 89-99, 2000.
Bredas et al. "Conjugated Polymeric Materials: Opportunities in Electronics, Optoelectronics, and Molecular Electronics", Applied Sciences 182, 1996.
Hirsch et al. "Bridged Mixed Valence Phthalocyaninato-Metal Compounds", Conjugated Polymeric Materials: Opportunities in Electronics, Optoelectronics, and Molecular Electronics, p. 163-169, 1990.
Kahn, Olivier "Chemistry and Physics of Molecular-Based Polymers Exhibiting A Spontaneous Magnetization", Conjugated Polymeric Materials: Opportunities in Electronics, Optoelectronics, and Molecular Electronics, p. 247-261, 1990.
Baughman et al. "Conducting Polymer Electromechanical Actuators", Conjugated Polymeric Materials: Opportunities in Electronics, Optoelectronics, and Molecular Electronics, p. 559-582, 1990.
Chia et al. "Working Supramolecular Machines Trapped in Glass and Mounted on a Film Surface", Angew. Chemie Int. Ed., 40(13): 2447-2451, 2001.
Communication Pursuant to Article 96(2) EPC Dated Jul. 10, 2006 From the European Patent Office Re.: Application No. 02725096.8.
Examiner Report Dated Jun. 24, 2008 From the Australian Government Re.: Application No. 2003281730.
International Preliminary Examination Report Dated Apr. 15, 2004 From the International Preliminary Examination Authority Re.: Application No. PCT/IL03/00612.
International Preliminary Examination Report Dated Jun. 19, 2003 From the International Preliminary Examination Authority Re.: Application No. PCT/US02/07178.
International Search Report Dated Jan. 30, 2004 From the International Searching Authority Re.: Application No. PCT/IL03/00612.
Official Action Dated Mar. 7, 2007 From the US Patent and Trademark Office Re.: U.S. Appl. No. 10/207,860.

Official Action Dated Jul. 10, 2006 From the US Patent and Trademark Office Re.: U.S. Appl. No. 10/207,860.

Official Action Dated Aug. 24, 2007 From the US Patent and Trademark Office Re.: U.S. Appl. No. 10/207,860.

Supplementary European Search Report Dated Jul. 13, 2005 From the European Patent Office Re.: Application No. 02725096.8.

Official Action Dated Aug. 24, 2007 From the US Patent and Trademark Office Re.: U.S. Appl. No. 10/207,860.

Official Action Dated Oct. 28, 2009 From the US Patent and Trademark Office Re.: U.S. Appl. No. 12/071,710.

Official Action Dated Mar. 7, 2007 From the US Patent and Trademark Office Re.: U.S. Appl. No. 10/207,860.

Response Dated Mar. 15, 2010 to Official Action Dated Dec. 15, 2009 From the US Patent and Trademark Office Re.: U.S. Appl. No. 10/468,840.

Response Dated Mar. 29, 2010 to Official Action of Oct. 28, 2009 From the US Patent and Trademark Office Re.: U.S. Appl. No. 12/071,710.

Communication Pursuant to Article 94(3) EPC Dated Mar. 18, 2010 From the European Patent Office Re.: Application No. 03741037.0.

* cited by examiner

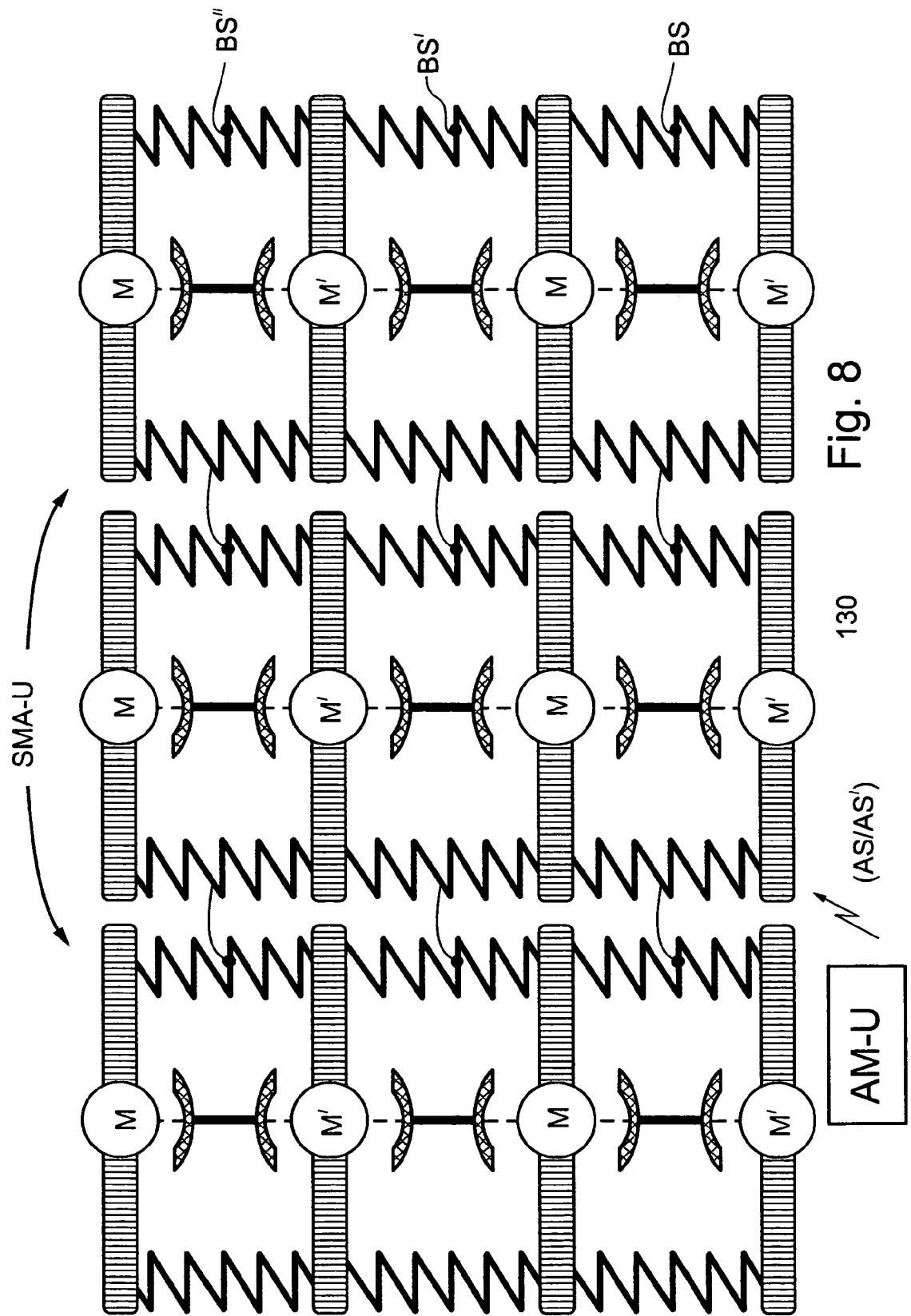

SYNTHETIC MOLECULAR SPRING DEVICE

RELATED PATENT APPLICATION

This application is a National Phase Application of PCT/US02/07178 International Filing Date 12 Mar. 2002, which claims priority from U.S. Provisional Patent Application No. 60/274,635 filed 12 Mar. 2001.

FIELD AND BACKGROUND OF THE INVENTION

The present invention relates to synthetic molecular level devices, such as synthetic molecular springs, engines, and, machines and, more particularly, to a synthetic molecular spring device. The synthetic molecular spring device of the present invention, generally featuring a synthetic molecular assembly and an activating mechanism, exhibits multi-parametric controllable spring-type elastic reversible function, structure, and behavior, operable in a wide variety of different environments. Different types of the primary components, that is, the synthetic molecular assembly and the activating mechanism, of the synthetic molecular spring device, may be selected from a wide variety of corresponding groups and sub-groups, while preserving the controllable spring-type elastic reversible function, structure, and behavior.

Molecular structures featuring the capability of contracting or expanding, in a controllable fashion, under the action of an external triggering or activating mechanism are expected to become key components in the developing fields of nano-devices, material science, robotics, biomimetics, and molecular electronics. Particularly, molecular structures capable of exhibiting and/or causing directional motions, for example, linear and/or rotational directional motions, triggered or activated by appropriate triggering or activating signals are needed in order to construct molecular devices whose operation and function exhibit, or include, spring-like, engine-like, and/or, machine-like, behavior.

In recent years, an increasing number of works and attempts to design, develop, and, implement, such molecular devices have been presented. Several such teachings are: Bissell, R. A., Cordova, E., Kaifer, A. E., and, Stoddart, J. F., "A Chemically and Electrochemically Switchable Molecular Shuttle", *Nature* 369, 133-137 (1994); Feringa, B. L., "In Control Of Molecular Motion", *Nature* 408, 151-154 (2000); Jimenez, M. C., Dietrich-Buchecker, C., and Sauvage, J. P., "Towards Synthetic Molecular Muscles: Contraction and Stretching of a Linear Rotaxane Dimer", *Angewandte Chemie-International Edition in English* 39, 3284-3287 (2000); Mahadevan, L. and Matsudaira, P., "Motility Powered by Supramolecular Springs and Ratchets", *Science* 288, 95-99 (2000); Otero, T. F. and Sansinena, J. M., "Soft and Wet Conducting Polymers for Artificial Muscles", *Advanced Materials* 10, 491-494 (1998); and, Tashiro, K., Konishi, K., and Aida, T., "Metal Bisporphyrinate Double-Decker Complexes as Redox-Responsive Rotating Modules, Studies on Ligand Rotation Activities of the Reduced and Oxidized Forms Using Chirality as a Probe", *Journal of the American Chemical Society* 122, 7921-7926 (2000).

These teachings relate to such molecular structures in the form of rotaxane molecules, catenanes molecules, polypyrrole films, single-walled nanotube sheets, among others. Several teachings relating specifically to rotaxane molecules and/or catenanes molecules are: Leigh, D. A., Troisi, A., and, Zebetto, F., "A Quantum-Mechanical Description of Macrocyclic Ring Rotation in Benzylic Amide [2]Catenanes", *Chemistry European Journal* 7, 1450-1454 (2001); Amendola, V., Fabbrizzi, L., Mangano, C., and, Pallavicini, P., "Molecular Machines Based on Metal Ion Translocation", *Accounts of Chemical Research* 34, 488-493 (2001); Collin, J. P., Dietrich-Buchecker, C., Gavina, P., Jimenez-Molero, M., and, Sauvage, J. P., "Shuttles and Muscles: Linear Molecular Machines Based on Transition Metals", *Accounts of Chemical Research* 34, 477-487 (2001); Ashton, P. R. et al., "Dual Mode 'Co-Conformational' Switching in Catenanes Incorporating Bipyridinium and Dialkylammonium Recognition Sites", *Chemistry European Journal* 7, 3482-3493 (2001); and, Cardenas, D. J. et al., "Synthesis, X-ray Structure, and Electrochemical and Excited-State Properties of Multicomponent Complexes Made of a [Ru(Tpy)2]2+Unit Covalently Linked to a [2]-Catenate Moiety. Controlling the Energy-Transfer Direction by Changing the Catenate Metal Ion", *Journal of the American Chemical Society* 121, 5481-5488 (1999).

Yet, these teachings, either singly or in combination, do not provide a satisfactory realization of a complete set of prerequisites and characteristics critically important for practical commercial application of a molecular device. Several such prerequisites and characteristics are: (1) capability of coupling to the macroscopic world, (2) capability of performing work, (3) modularity with respect to single or multi-dimensional scalability, (4) versatility, (5) robustness, (6) reversability, (7) operability in a continuous or discontinuous mode, (8) highly resolvable temporal response, and, (9) capability of being monitored during operation by a variety of different techniques.

A molecular structure, in the form of a chemical unit or module, which is potentially scalable, interactive, and/or, integratable with the macroscopic world, as part of a molecular device whose operation and function exhibit, or include, spring-like, engine-like, and/or, machine-like, behavior, is expected to be a key element in a wide range of future molecular applications.

A machine is generally defined as a device, usually having separate entities, bodies, components, and/or, elements, formed and connected to alter, transmit, and, direct, applied forces in a predetermined manner, in order to accomplish a specific objective or task, such as the performance of useful work. An engine is generally defined as a device or machine that converts energy into mechanical motion, to be clearly distinguished from an electric, spring-driven, or, hydraulic, motor operating by consuming an externally provided fuel.

Thus, a molecular structure, in the form of a chemical unit or module, featuring an interrelating collection of components and/or elements, that has the ability to store energy of predetermined chemical bonds in a particular molecular conformation, and convert the stored energy into mechanical motion, may be regarded as a molecular engine. In order to use such a molecular module as a whole or part of a molecular engine, it is necessary to control its action. One possibility relies on conditional formation and breakage of chemical bonds. Here, formation and breakage of chemical bonds translates to storage and release of potential energy, and concomitant molecular mechanical motion or movement. Although, it is quite common to find terms such as 'molecular machines', 'molecular engines', 'molecular springs', and other similar terms related to molecular structures and assemblies, practical implementation of the related mechanical properties, currently, is generally far from being demonstrated, for example, as highlighted by Amendola, V. et al., "Molecular Events Switched by Transition Metals", *Coordination Chemistry Reviews* 190, 649-669 (1999).

To date, the inventors are unaware of prior art teaching of a synthetic molecular spring device, featuring a synthetic molecular assembly and an activating mechanism, exhibiting multi-parametric controllable spring-type elastic reversible function, structure, and behavior, operable in a wide variety of different environments. There is thus a need for, and it would be highly advantageous to have such a synthetic molecular spring device.

SUMMARY OF THE INVENTION

The present invention relates to a synthetic molecular spring device. The synthetic molecular spring device, generally featuring a synthetic molecular assembly and an activating mechanism, exhibits multi-parametric controllable spring-type elastic reversible function, structure, and behavior, operable in a wide variety of different environments. Different types of the primary components, that is, the synthetic molecular assembly and the activating mechanism, of the synthetic molecular spring device, may be selected from a wide variety of corresponding groups and sub-groups, while preserving the controllable spring-type elastic reversible function, structure, and behavior.

Atom-axial ligand binding imposes deformation of molecular linker(s), included in the synthetic molecular assembly, into a contracted or expanded linear conformational state, due to the bonding energy released upon axial ligation to the atom centers. The activating signal, for example, photoactivation by electromagnetic radiation of an appropriate wavelength, causes the bonding interaction between the ligand and the atom to be altered, resulting in a partial or full dissociation of the atom-axial ligand pair. This allows the contracted linear conformational state of the molecular linker to relax/expand into its equilibrium (relaxed/expanded) conformational state. The relaxation/expansion is translated into a concomitant expansion of the molecular linker, in particular, and, of the synthetic molecular assembly, in general. Typical binding energies for axial ligation are about 10 Kcal/mol, depending on the particular ligand, atom, solvent, and, complexing group used. This energy is sufficient to cause a substantial change in the end-to-end distance of a molecular linker, therefore changing the effective total length of the synthetic molecular assembly structure. Terminating the activating signal, for example, the electromagnetic radiation, results in re-binding/association of the ligand to the atom center(s), and deforming the conformation of the molecular linker to its initial contracted conformational state. Thus a complete cycle of transitions of linear conformational states of the molecular linker of the synthetic molecular assembly is completed, and can be repeated by consecutive activation using the activating mechanism.

Thus, according to the present invention, there is provided a synthetic molecular spring device, comprising: (a) a synthetic molecular assembly featuring at least one chemical unit or module including: (i) at least one atom; (ii) at least one complexing group complexed to at least one of the at least one atom; (iii) at least one axial ligand reversibly physicochemically paired with at least one complexed atom; and (iv) at least one substantially elastic molecular linker having a body and having two ends with at least one end chemically bonded to another component of the synthetic molecular assembly; and (b) an activating mechanism operatively directed to at least one predetermined atom-axial ligand pair, whereby following the activating mechanism sending an activating signal to the at least one predetermined atom-axial ligand pair for physicochemically modifying the at least one predetermined atom-axial ligand pair, there is activating at least one cycle of spring-type elastic reversible transitions between contracted and expanded linear conformational states of the at least one molecular linker.

According to further features in preferred embodiments of the invention described below, the synthetic molecular assembly further comprises: (v) at least one chemical connector for chemically connecting the components of the synthetic molecular assembly to each other; and (vi) at least one binding site, each binding site located at a predetermined position of another component of the synthetic molecular assembly, for potentially binding each position of the synthetic molecular assembly to an external entity.

According to further features in preferred embodiments of the invention described below, the activating signal has two controllable general complementary levels, a first general complementary level and a second general complementary level, each general complementary level featuring a defined amplitude and duration.

According to further features in preferred embodiments of the invention described below, the first general complementary level of the activating signal is for activating the spring-type elastic reversible transition from a contracted linear conformational state to a expanded linear conformational state of the at least one molecular linker.

According to further features in preferred embodiments of the invention described below, the second general complementary level of the activating signal is for allowing the at least one molecular linker to return to the contracted linear conformational state.

According to further features in preferred embodiments of the invention described below, each general complementary level of the activating signal features at least one specific sub-level, each specific sub-level having an magnitude, intensity, amplitude, or strength.

According to further features in preferred embodiments of the invention described below, the spring-type elastic reversible transitions of the at least one molecular linker are characterized by a parameter being a molecular linker inter-end effective distance change, for indicating sign and magnitude of change of an effective distance between two arbitrarily selected ends of the at least one molecular linker.

According to further features in preferred embodiments of the invention described below, the complexed atom is selected from the group consisting of at least one neutral atom, and, at least one positively charged atom, capable of forming at least one additional chemical bond of varying degree or extent of covalency, coordination, or, ionic strength, with another component of the synthetic molecular assembly.

According to further features in preferred embodiments of the invention described below, the complexed atom is a cation of an element selected from the group consisting of magnesium, chromium, manganese, iron, ruthenium, osmium, cobalt, rhodium, nickel, copper, zinc, silicon, and, titanium.

According to further features in preferred embodiments of the invention described below, the complexing group functions by locally positioning the complexed atom with respect to overall structure of the synthetic molecular assembly, and/or, the complexing group functions by locally positioning the complexed atom with respect to structure and position of a molecular linker.

According to further features in preferred embodiments of the invention described below, the complexing group functions by tuning or adjusting bonding/debonding energy of the atom-axial ligand pair.

According to further features in preferred embodiments of the invention described below, the complexing group functions by tuning or adjusting activation energy required for the activating the spring-type elastic reversible transitions of the molecular linker.

According to further features in preferred embodiments of the invention described below, the complexing group is a chemical compound capable of complexing, via at least one chemical bond of varying degree or extent of covalency, coordination, or, ionic strength, the atom, and, has a variable geometrical configuration or form with variable dimensions and flexibility.

According to further features in preferred embodiments of the invention described below, the complexing group is a chemical compound selected from the group consisting of cyclic chemical compounds, polycyclic chemical compounds, noncyclic chemical compounds, linear chemical compounds, branched chemical compounds, and, combinations thereof.

According to another aspect of the present invention, there is provided a synthetic molecular spring device, comprising: (a) a synthetic molecular assembly featuring one chemical unit or module including: (i) two atoms; (ii) two complexing groups, each complexed to a corresponding atom; (iii) an axial bidentate ligand reversibly physicochemically paired with each of the two atoms via corresponding atom-axial ligand pairs, and, (iv) a first substantially elastic molecular linker having a body, and, having two ends each chemically bonded to a single corresponding complexing group, and, a second substantially elastic molecular linker having a body, and, having two ends each chemically bonded to a single corresponding complexing group; and, (b) an activating mechanism operatively directed to at least one of two atom-axial ligand pairs, whereby following the activating mechanism sending an activating signal to at least one of the two atom-axial ligand pairs for physicochemically modifying the at least one of the two atom-axial ligand pairs, there is activating at least one cycle of spring-type elastic reversible transitions between a contracted linear conformational state and an expanded linear conformational state of the molecular linker.

The present invention successfully overcomes several basic shortcomings and limitations of presently known configurations of synthetic molecular level devices, such as synthetic molecular springs.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the drawings:

FIG. 8 is a schematic diagram illustrating a side view of a third exemplary preferred embodiment of a scaled-up synthetic molecular spring device, featuring a two-dimensional array configuration of a scaled-up synthetic molecular assembly, SMA-U, and, a scaled-up activating mechanism, AM-U, in accordance with the present invention.

DESCRIPTION OF THE PREFERRED EMBODIMENTS

Figure 1:
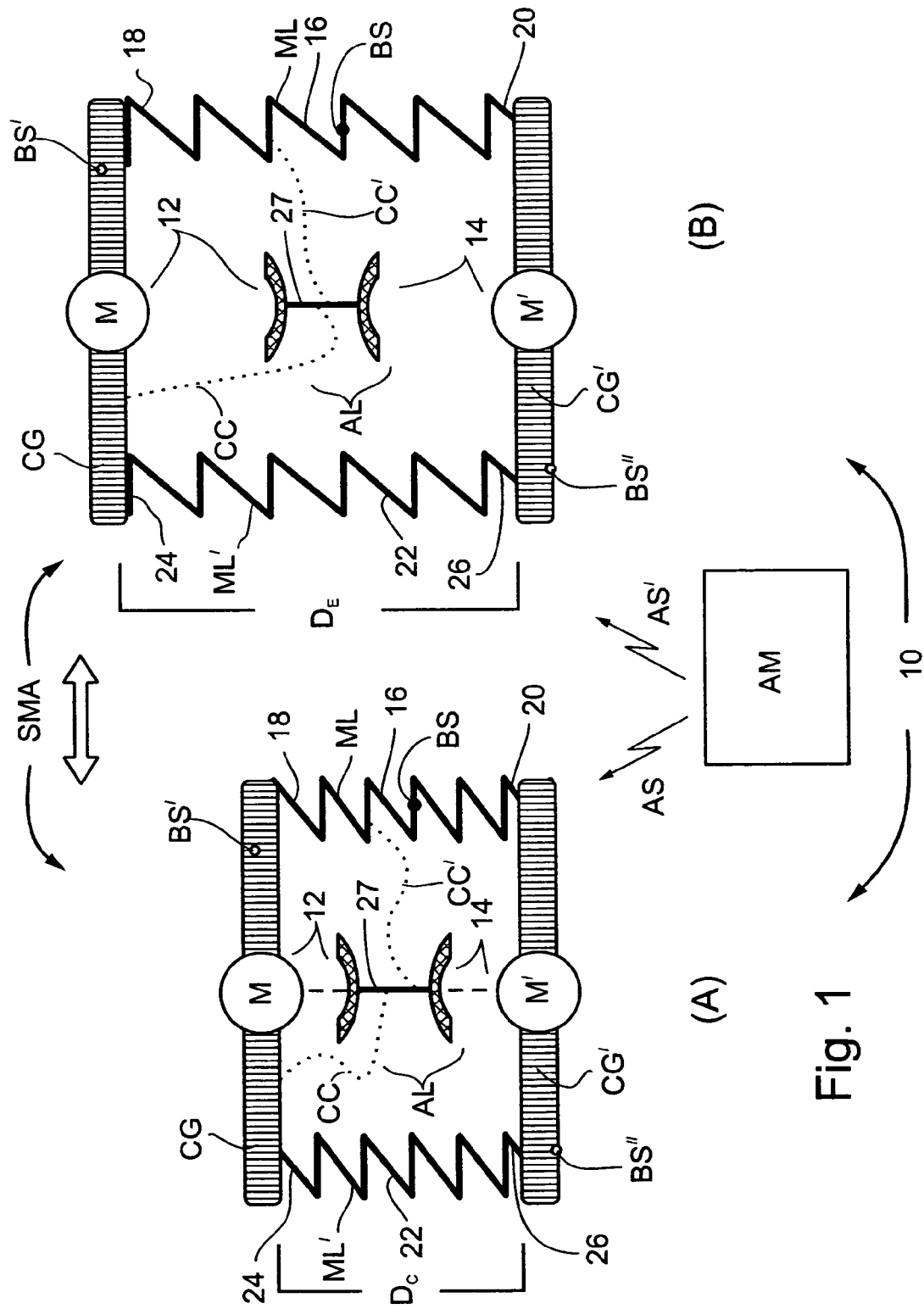
FIG. 1 is a schematic diagram illustrating a side view of a first exemplary preferred embodiment of the synthetic molecular spring device, wherein (A) shows the molecular linkers, ML and ML', in a contracted conformational state, and, (B) shows the molecular linkers, ML and ML', in an expanded conformational state, in accordance with the present invention.

The present invention relates to a synthetic molecular spring device. It is noted herein, that the present invention relates to and is focused on a 'synthetic' molecular spring device, based on components and elements which are synthetically made and/or modified using techniques of synthetic chemistry, in contrast to 'natural' molecular spring devices, based on components and elements naturally existing in the form of molecular structures and assemblies, such as naturally existing 'biochemical' or 'molecular biological' types of molecular structures and assemblies which may, under specified conditions, be considered to exhibit properties and functions of a molecular spring device.

A main aspect of novelty, inventiveness, and, commercial applicability, of the present invention is that the synthetic molecular spring device exhibits multi-parametric controllable spring-type elastic reversible function, structure, and behavior, operable in a wide variety of different environments, in strong contrast to prior art synthetic molecular spring-type devices which may exhibit limited parametric controllable spring-type elastic structure, function, and behavior, typically, operable only in very specific types of environments.

Another aspect of novelty and inventiveness of the present invention is that different types of the primary components, that is, the synthetic molecular assembly and the activating mechanism, of the synthetic molecular spring device, may be selected from a wide variety of corresponding groups and sub-groups, while preserving the controllable spring-type elastic reversible function, structure, and behavior. This aspect is in strong contrast to prior art synthetic molecular spring-type devices whose spring-type structure, function, and behavior, and control thereof, are not readily preserved by changing types of primary components.

Another aspect of novelty and inventiveness of the present invention is that the multi-parametric controllable spring-type elastic reversible function, structure, and behavior, are deterministic in a relatively simple manner, whereby, for example, a profile or graphical plot of deformation versus equilibrium energy of the synthetic molecular assembly, is predictable in a relatively simple manner.

Another aspect of novelty and inventiveness of the present invention is that the multi-parametric controllable spring-type elastic reversible function, structure, and behavior, exhibited by the synthetic molecular spring device, feature several prerequisites and characteristics critically important for practical commercial application. Such prerequisites and characteristics are (1) capability of coupling to the macroscopic world, (2) capability of performing work, (3) modularity with respect to single or multi-dimensional scalability, (4) versatility, (5) robustness, (6) elastic type of reversability, (7) operability in a continuous or discontinuous mode, (8) highly resolvable temporal response, and, (9) capability of being monitored during operation by using different techniques, for example, spectroscopic and/or mechanical techniques.

Some specific unique aspects and advantages of the present invention are as follows:

Capability of fast, for example, in the case of photoexcitation, as well as slow, for example, in the case of pH control, time scale functioning of the synthetic molecular spring device.

No chemical, or other by-products are generated during the working cycle. The working cycle is based on reversible processes. This property is highly important for a molecular device to be able to operate in a continuous and efficient manner.

The modular functional/structural approach provides a variety of activating and controlling means. Thus, it is possible to control the synthetic molecular spring device in accordance with specific properties and characteristics of the individual components. For example, it is possible to activate a [Ni]Porphyrin based the synthetic molecular spring device by photoexcitation, electro-reduction/oxidation, or, by a chemical manipulation such as introducing a monodentate ligand into the synthetic molecular assembly of the synthetic molecular spring device. In a similar synthetic molecular spring device based on [Zn]Porphyrin, only chemical control is accessible, thereby providing selectivity with respect to implementing the synthetic molecular spring device.

It is possible to operate various embodiments of the synthetic molecular spring device in different environments. For example, it is possible to introduce hydrophilic or hydrophobic substituents in peripheral positions of the synthetic molecular assembly, in order to make the synthetic molecular assembly more water or organic soluble. The intrinsic functions of the synthetic molecular spring device, via the expansion/contraction transitions are generally not sensitive to the solvent environment.

The induced motion of the molecular linker in the synthetic molecular assembly of the synthetic molecular spring device is not based on a thermal fluctuation type of phenomenon, such as that described by Asfari, Z. and Vicens, J., "Molecular Machines", *Journal of Inclusion Phenomena and Macrocyclic Chemistry* 36, 103-118 (2000).

Spectroscopic techniques, and, more 'mechanical' types of monitoring techniques, for example, Atomic Force Microscopy, can be used in order to monitor operation of the synthetic molecular spring device.

The synthetic molecular spring device of the present invention is operable under variable operating conditions and in a variety of different environments, part of or coupled to and interactive with the macroscopic world. For example, as part of implementing the synthetic molecular spring device, the synthetic molecular assembly may be used as an entity in a state of matter selected from the group consisting of the solid state, the liquid state, the gas state, and, combinations thereof, for performing mechanical work at the molecular level, for mechanically altering the conformation of a substrate molecule, or, any other manipulation at the molecular level. In particular, the synthetic molecular assembly may be used in a variety of modes physicochemically interactive with a substrate, where the substrate is, for example, a molecular or macromolecular entity, or, a composite of atoms.

It is to be understood that the invention is not limited in its application to the details of construction, arrangement, and, composition of the components of the synthetic molecular spring device applying thereof, or, to the details of the order or sequence of steps of operation or implementation of the device, set forth in the following description, drawings, or examples. For example, the following description includes only a few practically applicable and potentially commercially feasible exemplary preferred embodiments of the synthetic molecular spring device, in order to illustrate implementation of the present invention. The invention is capable of other embodiments or of being practiced or carried out in various ways. Also, it is to be understood that the phraseology, terminology, and, notation, employed herein are for the purpose of description and should not be regarded as limiting. For example, with respect to terminology and notation used for describing function of the activating signal of the activating mechanism of the synthetic molecular spring device, as specifically noted herein below.

A synthetic molecular spring device, according to the present invention, is better understood with reference to the following description and accompanying drawings. Throughout the following description and accompanying drawings, like reference letters, acronyms, symbols, or, numbers, refer to like components or elements. Immediately following is a brief description of the structure and function of the generalized synthetic molecular spring device of the present invention, followed thereafter by detailed descriptions and illustrations of five different exemplary preferred embodiments of the generalized synthetic molecular spring device.

The generalized synthetic molecular spring device of the present invention features the following primary components: (a) a synthetic molecular assembly (SMA) featuring at least one chemical unit or module including: (i) at least one atom (M), (ii) at least one complexing group (CG) complexed to at least one atom (M), (iii) at least one axial ligand (AL) reversibly physicochemically paired with at least one atom (M) complexed to a complexing group (CG), and, (iv) at least one substantially elastic molecular linker (ML) having a body, and, having two ends with at least one end chemically bonded to another component of the synthetic molecular assembly (SMA); and, (b) an activating mechanism (AM) operatively directed to at least one predetermined atom-axial ligand pair, whereby following the activating mechanism (AM) sending an activating signal (AS/AS') to the at least one predetermined atom-axial ligand pair for physicochemically modifying the atom-axial ligand pair, there is activating at least one cycle of spring-type elastic reversible transitions between contracted and expanded linear conformational states of at least one predetermined molecular linker (ML).

The synthetic molecular assembly (SMA), optionally, includes additional components: (v) at least one chemical connector (CC) for chemically connecting components of the synthetic molecular assembly (SMA) to each other, and/or, (vi) at least one binding site (BS), each located at a predetermined position of another component of the synthetic molecular assembly (SMA), for potentially binding that position of the synthetic molecular assembly (SMA) to an external entity part of or separate from a more encompassing mechanism or device.

The activating signal has two controllable general complementary levels, each with defined amplitude and duration, that is, a first general complementary level, herein referred to as AS, and, a second general complementary level, herein referred to as AS'. The first general complementary level, AS, of the activating signal (AS/AS') is sent to the at least one predetermined atom-axial ligand pair for physicochemically modifying the atom-axial ligand pair, via a first direction of a reversible physicochemical mechanism consistent with the basis of operation of the activating mechanism (AM), whereby there is activating a spring-type elastic reversible transition from a contracted linear conformational state, herein referred to as (A), to an expanded linear conformational state, herein referred to as (B), of the at least one predetermined molecular linker (ML). The second general complementary level, AS', of the activating signal (AS/AS') allows the at least one predetermined molecular linker (ML) to return to contracted linear conformational state (A).

In alternative embodiments of the present invention, the physicochemical relationship between the atom-axial ligand pair and the molecular linker (ML) is opposite to that relationship described above, whereby the first general complementary level, AS, of the activating signal (AS/AS') allows the at least one predetermined molecular linker (ML) to come to a contracted linear conformational state (A). The second general complementary level, AS', of the activating signal (AS/AS') is sent to the at least one predetermined atom-axial ligand pair for physicochemically modifying the atom-axial ligand pair, via a second direction of a reversible physicochemical mechanism consistent with the basis of operation of the activating mechanism (AM), whereby there is activating a spring-type elastic reversible transition from an expanded linear conformational state (B) to a contracted linear conformational state (A) of the at least one predetermined molecular linker (ML).

It is noted that, in order not to limit the meaning of the function of the activating signal of the activating mechanism (AM), in practice, with respect to terminology and notation, the two controllable general complementary levels, AS and AS', of the activating signal (AS/AS'), are interchangeable, whereby, the activating signal (AS/AS') may be written as the activating signal (AS'/AS).

Moreover, it is noted herein that each general complementary level, AS and AS', or, AS' and AS, of the activating signal (AS/AS') or (AS'/AS), respectively, features at least one specific sub-level, preferably, a plurality of specific sub-levels, of magnitude, intensity, amplitude, or strength.

Transition from a contracted to an expanded linear conformational state, or, from an expanded to a contracted linear conformational state, of a predetermined molecular linker (ML) is characterized by a parameter, herein, referred to as the molecular linker inter-end effective distance change, $D_E$-$D_C$, or, $D_C$-$D_E$, respectively, indicating the sign, that is, positive or negative, respectively, and, the magnitude, of the change of the 'effective' distance, D, between the two ends of a single molecular linker (ML), or, between two arbitrarily selected ends of a plurality of molecular linkers (ML), included in a particular synthetic molecular assembly (SMA), following the respective transition in linear conformational states. For this parameter, $D_C$ refers to the molecular linker inter-end effective distance, D, when the synthetic molecular assembly (SMA), is in a contracted linear conformational state, and, $D_E$ refers to the molecular linker inter-end effective distance, D, when the synthetic molecular assembly (SMA), is in an expanded linear conformational state.

Referring now to the drawings, FIG. 1 is a schematic diagram illustrating a side view of a first exemplary preferred embodiment of the synthetic molecular spring device of the present invention, wherein (A) shows the molecular linker, ML, in a contracted conformational state, and, (B) shows the molecular linker, ML, in an expanded conformational state.

In FIGS. 1 [(A) and (B)], synthetic molecular spring device 10 features primary components: (a) a synthetic molecular assembly, SMA, featuring one chemical unit or module including: (i) two atoms, M and M', (ii) two complexing groups, CG and CG', each complexed to a corresponding atom, M and M', respectively, (iii) an axial bidentate ligand, AL, reversibly physicochemically paired with each of the two atoms M and M', via corresponding atom-axial ligand pairs 12 and 14, respectively, and, (iv) a first substantially elastic molecular linker, ML, having a body 16, and, having two ends 18 and 20 each chemically bonded to a single corresponding complexing group, CG and CG', respectively, and, a second substantially elastic molecular linker, ML', having a body 22, and, having two ends 24 and 26 each chemically bonded to a single corresponding complexing group, CG and CG', respectively; and, (b) an activating mechanism, AM, operatively directed to at least one of the two atom-axial ligand pairs 12 and 14, whereby following the activating mechanism, AM, sending an activating signal, AS/AS', to at least one of the two atom-axial ligand pairs 12 and 14, for physicochemically modifying at least one of the two atom-axial ligand pairs 12 and 14, there is activating at least one cycle of spring-type elastic reversible transitions (indicated by the double lined two directional arrow) between a contracted linear conformational state (A) and an expanded linear conformational state (B) of the molecular linker, ML.

As shown in FIG. 1, the synthetic molecular assembly, SMA, includes additional components: (v) two chemical connectors, CC and CC', for chemically connecting the body 27 of the axial bidentate ligand, AL, to the complexing group, CG, and, to the body 16 of the first molecular linker, ML, respectively, and, (vi) three binding sites, BS, BS', and BS", located at the body 16 of the first molecular linker, ML, at the complexing group, CG, and, at the complexing group, CG', respectively, for potentially binding these positions of the synthetic molecular assembly, SMA, to an external entity (not shown in FIG. 1) part of or separate from a more encompassing mechanism or device.

Transition (indicated by the double lined two directional arrow) from the contracted (A) to the expanded (B) linear conformational state, or, from the expanded (B) to the contracted (A) linear conformational state, of each of the two molecular linkers, ML, and ML', is characterized by the previously defined parameter, the molecular linker inter-end effective distance change, $D_E$-$D_C$, or, $D_C$-$D_E$, respectively, indicating the sign, that is, positive or negative, respectively, and, the magnitude, of the change in the inter-end effective distance, D, between the two arbitrarily selected ends 24 and 26 of the second molecular linker, ML', following the respective transition in linear conformational states, as indicated in FIG. 1.

Figure 2:
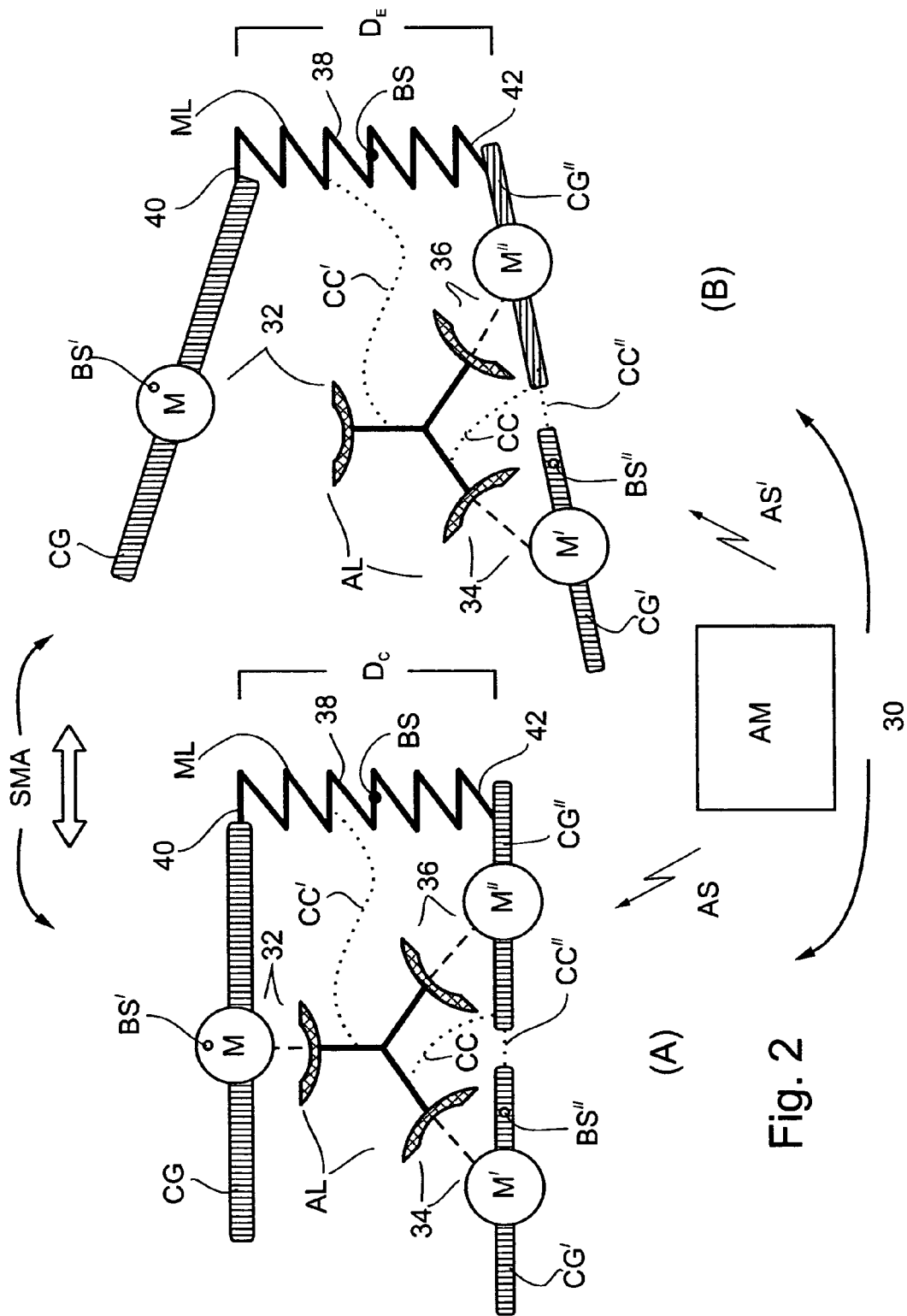
FIG. 2 is a schematic diagram illustrating a side view of a second exemplary preferred embodiment of the synthetic molecular spring device, wherein (A) shows the molecular linker, ML, in a contracted conformational state, and, (B) shows the molecular linker, ML, in an expanded conformational state, in accordance with the present invention.

FIG. 2 is a schematic diagram illustrating a side view of a second exemplary preferred embodiment of the synthetic molecular spring device of the present invention, wherein (A) shows the molecular linker, ML, in a contracted conformational state, and, (B) shows the molecular linker, ML, in an expanded conformational state.

In FIGS. 2 [(A) and (B)], synthetic molecular spring device 30 features primary components: (a) a synthetic molecular assembly, SMA, featuring one chemical unit or module including: (i) three atoms, M, M', and, M'', (ii) three complexing groups, CG, CG', and, CG'', each complexed to a corresponding atom, M, M', M'', respectively, (iii) an axial tridentate ligand, AL, reversibly physicochemically paired with each of the three atoms M, M', and, M'', via corresponding atom-axial ligand pairs 32, 34, and, 36, respectively, and, (iv) a substantially elastic molecular linker, ML, having a body 38, and, having two ends 40 and 42 each chemically bonded to a single complexing group, CG and CG'', respectively; and, (b) an activating mechanism, AM, operatively directed to at least one of the three atom-axial ligand pairs 32, 34, and, 36, for example, atom-axial ligand pair 32 (as shown), whereby following the activating mechanism, AM, sending an activating signal, AS/AS', to at least one of the three atom-axial ligand pairs 32, 34, and, 36, for example, atom-axial ligand pair 32 (as shown), for physicochemically modifying at least one of the three atom-axial ligand pairs 32, 34, and, 36, for example, atom-axial ligand pair 32 (as shown), there is activating at least one cycle of spring-type elastic reversible transitions (indicated by the double lined two directional arrow) between a contracted linear conformational state (A) and an expanded linear conformational state (B) of the molecular linker, ML.

As shown in FIG. 2, the synthetic molecular assembly, SMA, includes additional components: (v) three chemical connectors, CC and CC', for chemically connecting the axial tridentate ligand, AL, to the body 38 of the molecular linker, ML, and, to the complexing group, CG'', respectively, and, CC'' for chemically connecting the two complexing groups, CG' and CG'', to each other, and, (vi) three binding sites, BS, BS', and BS'', located at the body 38 of the molecular linker, ML, at the atom, M, and, at the complexing group, CG', respectively, for potentially binding these positions of the synthetic molecular assembly, SMA, to an external entity (not shown in FIG. 2) part of or separate from a more encompassing mechanism or device.

Transition (indicated by the double lined two directional arrow) from the contracted (A) to the expanded (B) linear conformational state, or, from the expanded (B) to the contracted (A) linear conformational state, of the molecular linker, ML, is characterized by the previously defined parameter, the molecular linker inter-end effective distance change, $D_E$-$D_C$, or, $D_C$-$D_E$, respectively, indicating the sign, that is, positive or negative, respectively, and, the magnitude, of the change in the inter-end effective distance, D, between the two ends 40 and 42 of the molecular linker, ML, following the respective transition in linear conformational states, as indicated in FIG. 2.

Figure 3:
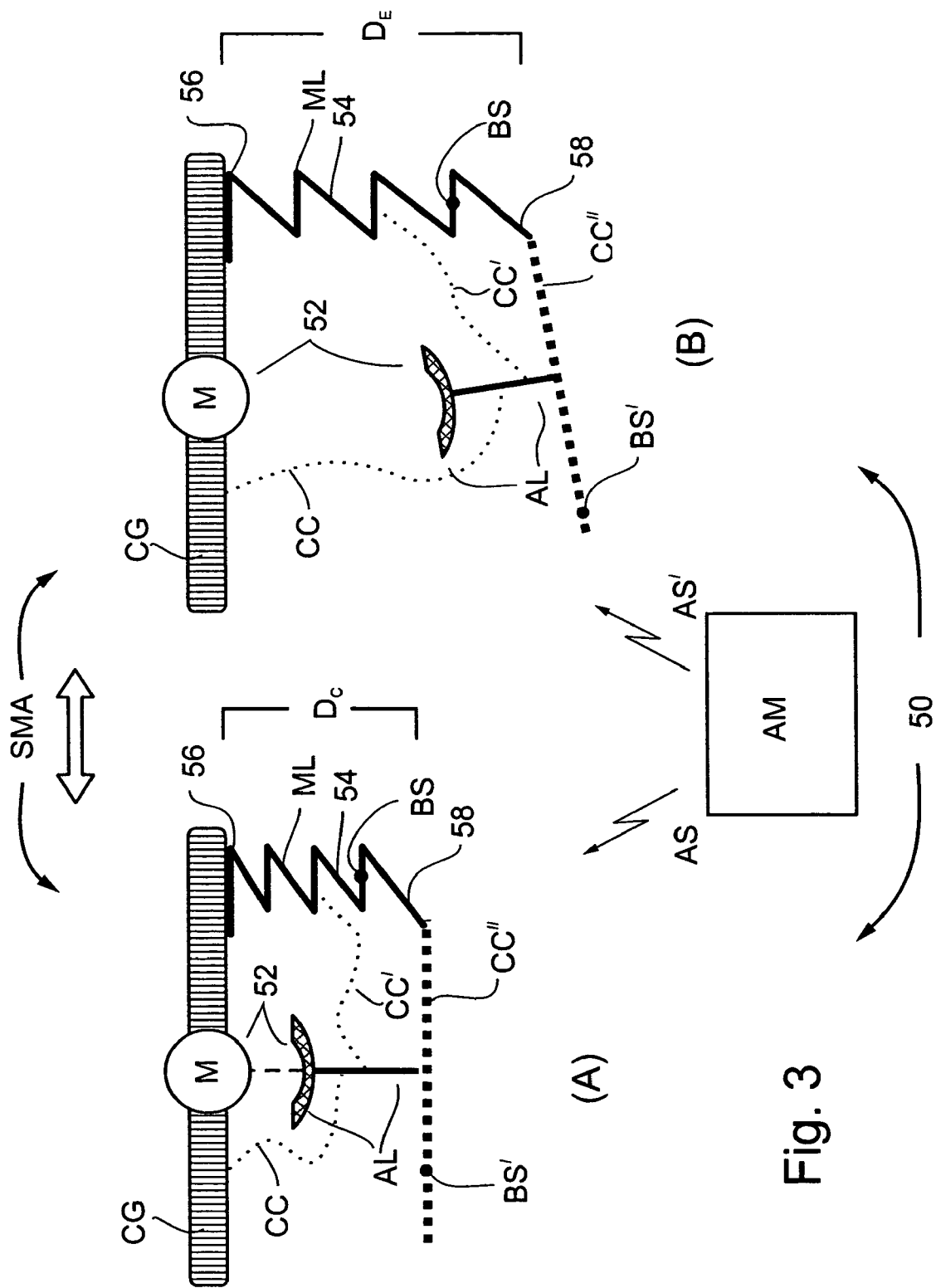
FIG. 3 is a schematic diagram illustrating a side view of a third exemplary preferred embodiment of the synthetic molecular spring device, wherein (A) shows the molecular linker, ML, in a contracted conformational state, and, (B) shows the molecular linker, ML, in an expanded conformational state, in accordance with the present invention.

FIG. 3 is a schematic diagram illustrating a side view of a third exemplary preferred embodiment of the synthetic molecular spring device of the present invention, wherein (A) shows the molecular linker, ML, in a contracted conformational state, and, (B) shows the molecular linker, ML, in an expanded conformational state.

In FIGS. 3 [(A) and (B)], synthetic molecular spring device 50 features primary components: (a) a synthetic molecular assembly, SMA, featuring one chemical unit or module including: (i) one atom, M, (ii) one complexing group, CG, complexed to the atom, M, (iii) an axial monodentate ligand, AL, reversibly physicochemically paired with the atom M, via atom-axial ligand pair 52, and, (iv) a substantially elastic molecular linker, ML, having a body 54, and, having two ends 56 and 58, where end 54 is chemically bonded to the complexing group, CG, and, end 56 is chemically bonded via chemical connector, CC'', to the axial monodentate ligand, AL; and, (b) an activating mechanism, AM, operatively directed to atom-axial ligand pair 52, whereby following activating mechanism, AM, sending an activating signal, AS/AS', to the atom-axial ligand pair 52, for physicochemically modifying the atom-axial ligand pair 52, there is activating at least one cycle of spring-type elastic reversible transitions (indicated by the double lined two directional arrow) between a contracted linear conformational state (A) and an expanded linear conformational state (B) of the molecular linker, ML.

As shown in FIG. 3, the synthetic molecular assembly, SMA, includes additional components: (v) three chemical connectors, CC and CC', for chemically connecting the axial monodentate ligand, AL, to the complexing group, CG, and, to the body 54 of the molecular linker, ML, respectively, and, CC'' for chemically connecting the end 58 of the molecular linker, ML, to the axial monodentate ligand, AL, and, (vi) two binding sites, BS and BS', located at the body 54 of the molecular linker, ML, and, at the chemical connector, CC'', respectively, for potentially binding these positions of the synthetic molecular assembly, SMA, to an external entity (not shown in FIG. 3) part of or separate from a more encompassing mechanism or device.

Transition (indicated by the double lined two directional arrow) from the contracted (A) to the expanded (B) linear conformational state, or, from the expanded (B) to the contracted (A) linear conformational state, of the molecular linker, ML, is characterized by the previously defined parameter, the molecular linker inter-end effective distance change, $D_E$-$D_C$, or, $D_C$-$D_E$, respectively, indicating the sign, that is, positive or negative, respectively, and, the magnitude, of the change in the inter-end effective distance, D, between the two ends 56 and 58 of the molecular linker, ML, following the respective transition in linear conformational states, as indicated in FIG. 3.

Figure 4:
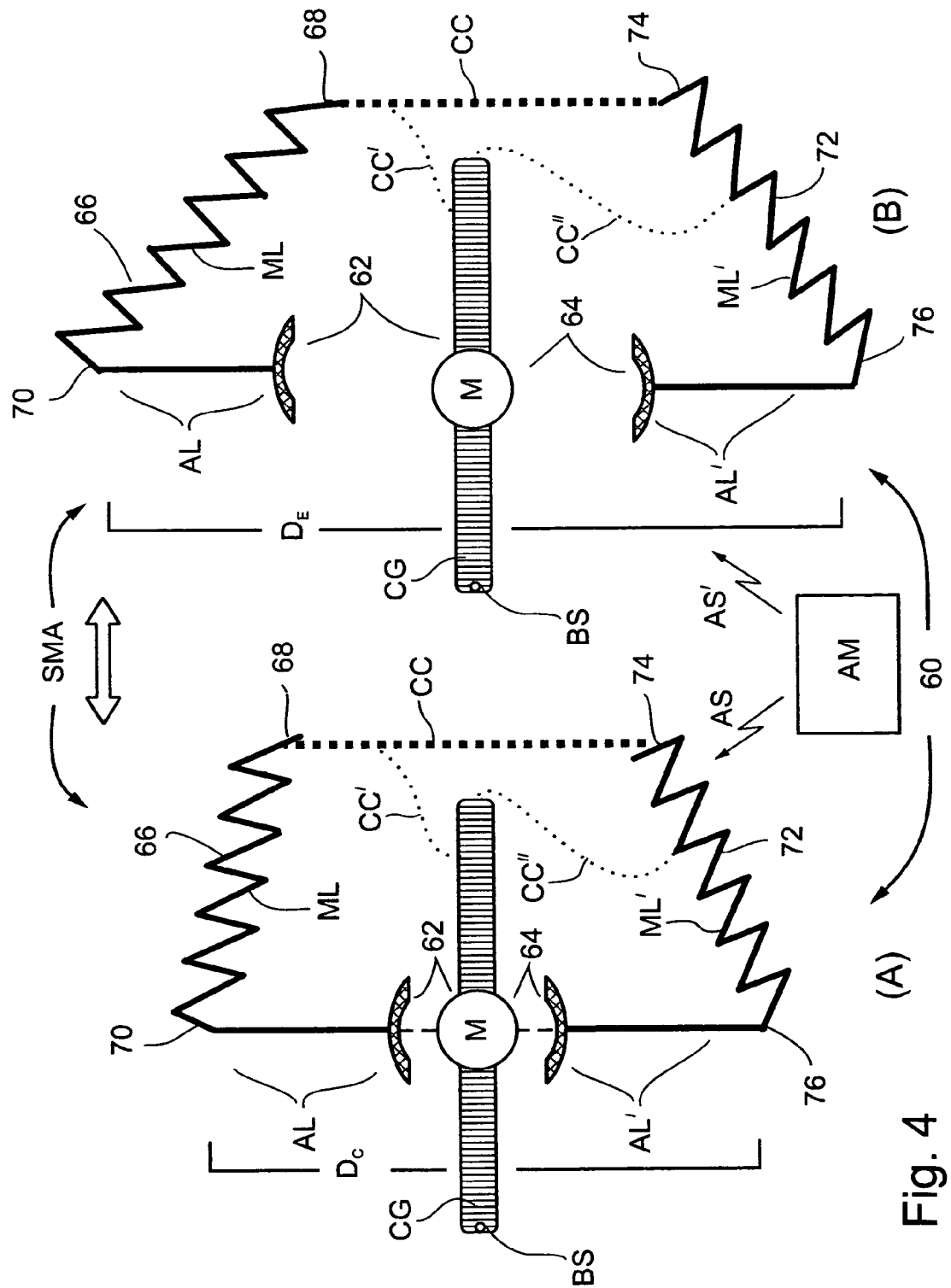
FIG. 4 is a schematic diagram illustrating a side view of a fourth exemplary preferred embodiment of the synthetic molecular spring device, wherein (A) shows the molecular linkers, ML and ML', in a contracted conformational state, and, (B) shows the molecular linkers, ML and ML', in an expanded conformational state, in accordance with the present invention.

FIG. 4 is a schematic diagram illustrating a side view of a fourth exemplary preferred embodiment of the synthetic molecular spring device of the present invention, wherein (A) shows the molecular linker, ML, in a contracted conformational state, and, (B) shows the molecular linker, ML, in an expanded conformational state.

In FIGS. 4 [(A) and (B)], synthetic molecular spring device 60 features primary components: (a) a synthetic molecular assembly, SMA, featuring one chemical unit or module including: (i) one atom, M, (ii) one complexing group, CG, complexed to the atom, M, (iii) two axial monodentate ligands, AL and AL', each reversibly physicochemically paired with atom M, via corresponding atom-axial ligand pairs 62 and 64, respectively, and, (iv) a first substantially elastic molecular linker, ML, having a body 66, and, having two ends 68 and 70, where end 68 is chemically bonded to a first chemical connector, CC, and, end 70 is chemically bonded to the first axial monodentate ligand, AL, and, a second substantially elastic molecular linker, ML', having a body 72, and, having two ends 74 and 76, where end 74 is chemically bonded to the first chemical connector, CC, and, end 76 is chemically bonded to the second axial monodentate ligand, AL'; and, (b) an activating mechanism, AM, operatively directed to at least one of the two atom-axial ligand pairs 62 and 64, for example, both atom-axial ligand bonds 62 and 64 (as shown), whereby following the activating mechanism, AM, sending an activating signal, AS/AS', to at least one of the two atom-axial ligand pairs 62 and 64, for example, both atom-axial ligand bonds 62 and 64 (as shown), for physicochemically modifying at least one of the two atom-axial ligand bonds 62 and 64, for example, both atom-axial ligand bonds 62 and 64 (as shown), there is activating at least one cycle of spring-type elastic reversible transitions (indicated by the double lined two directional arrow) between a contracted linear conformational state (A) and an expanded linear conformational state (B) of the molecular linkers, ML and ML'.

As shown in FIG. 4, the synthetic molecular assembly, SMA, includes additional components: (v) three chemical connectors, CC, for chemically connecting the end 68 of the first molecular linker, ML, to the end 74 of the second molecular linker, ML', CC', for chemically connecting the complexing group, CG, to the chemical connector, CC, and, CC", for chemically connecting the complexing group, CG, to the body 72 of the second molecular linker, ML', and, (vi) one binding site, BS, located at the complexing group, CG, for potentially binding this position of the synthetic molecular assembly, SMA, to an external entity (not shown in FIG. 4) part of or separate from a more encompassing mechanism or device.

Transition (indicated by the double lined two directional arrow) from the contracted (A) to the expanded (B) linear conformational state, or, from the expanded (B) to the contracted (A) linear conformational state, of at least one of the two molecular linkers, ML and ML', is characterized by the previously defined parameter, the molecular linker inter-end effective distance change $D_E$-$D_C$, or, $D_C$-$D_E$, respectively, indicating the sign, that is, positive or negative, respectively, and, the magnitude, of the change in the inter-end effective distance, D, between the two arbitrarily selected ends 70 and 76 of the first molecular linker, ML, and the second molecular linker, ML', respectively, following the respective transition in linear conformational states, as indicated in FIG. 4.

Figure 5:
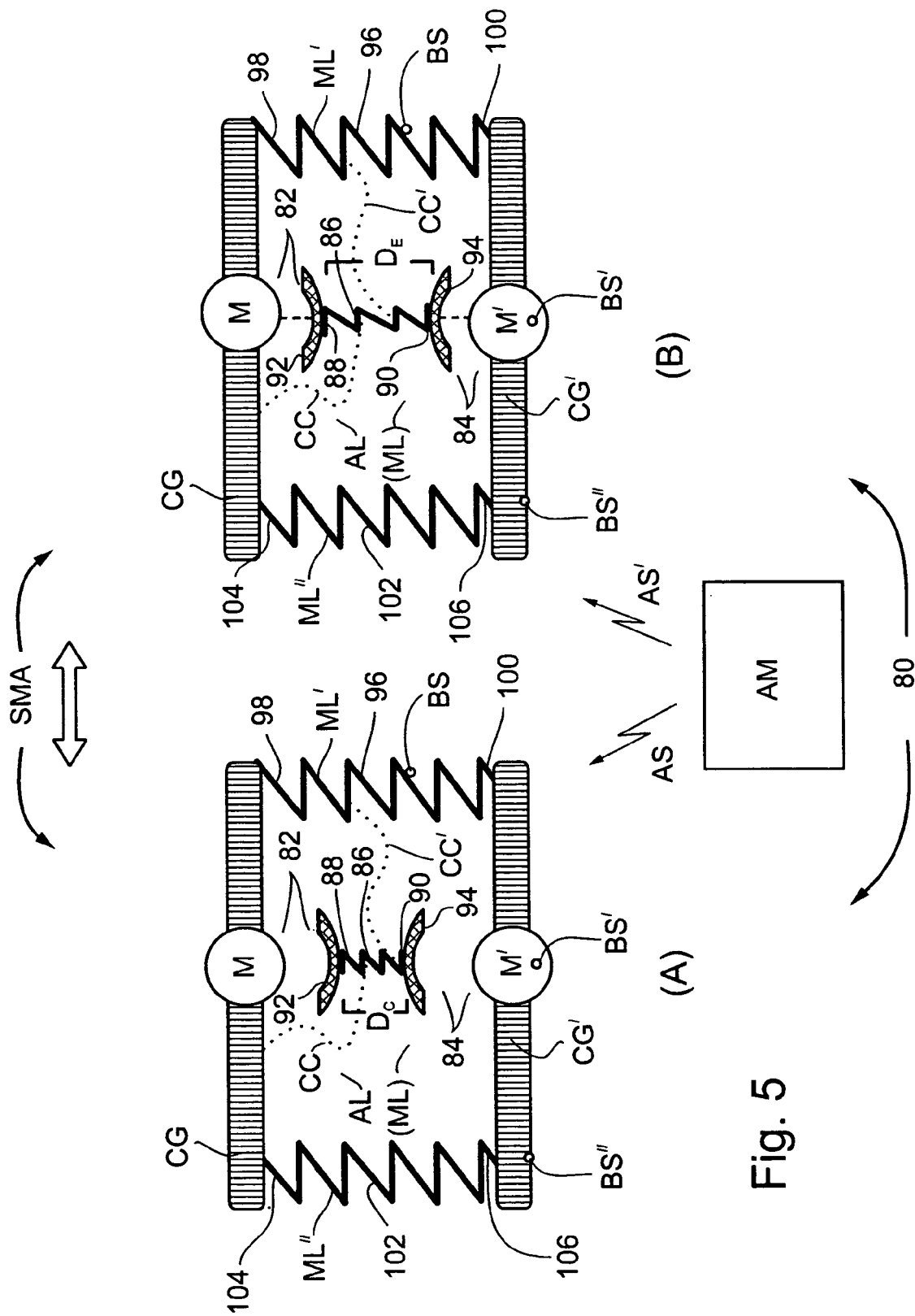
FIG. 5 is a schematic diagram illustrating a side view of a fifth exemplary preferred embodiment of the synthetic molecular spring device, wherein (A) shows the molecular linker, ML, in a contracted conformational state, and, (B) shows the molecular linker, ML, in an expanded conformational state, in accordance with the present invention.

FIG. 5 is a schematic diagram illustrating a side view of a fifth exemplary preferred embodiment of the synthetic molecular spring device of the present invention, wherein (A) shows the molecular linker, ML, in a contracted conformational state, and, (B) shows the molecular linker, ML, in an expanded conformational state.

In FIGS. 5 [(A) and (B)], synthetic molecular spring device 80 features primary components: (a) a synthetic molecular assembly, SMA, featuring one chemical unit or module including: (i) two atoms, M and M', (ii) two complexing groups, CG and CG', each complexed to a corresponding atom, M and M', respectively, (iii) an axial bidentate ligand, AL, reversibly physicochemically paired with each of the two atoms M and M', via corresponding atom-axial ligand pairs 82 and 84, respectively, where, in this exemplary preferred embodiment, in contrast to the four previously described and illustrated exemplary preferred embodiments (FIGS. 1-4), the body 86 of the axial bidentate ligand, AL, is a substantially elastic molecular linker, ML, having body 86, and, having two ends 88 and 90 each chemically bonded to a single end 92 and 94, respectively, of the axial bidentate ligand, AL, and, (iv) a first substantially rigid molecular linker, ML', having a body 96, and, having two ends 98 and 100 each chemically bonded to a single corresponding complexing group, CG and CG', respectively, and, a second substantially rigid molecular linker, ML", having a body 102, and, having two ends 104 and 106 each chemically bonded to a single corresponding complexing group, CG and CG', respectively; and, (b) an activating mechanism, AM, operatively directed to at least one of the two atom-axial ligand pairs 82 and 84, for example, both atom-axial ligand bonds 82 and 84 (as shown), whereby following the activating mechanism, AM, sending an activating signal, AS/AS', to at least one of the two atom-axial ligand pairs 82 and 84, for example, both atom-axial ligand bonds 82 and 84 (as shown), for physicochemically modifying at least one of the two atom-axial ligand pairs 82 and 84, for example, both atom-axial ligand bonds 82 and 84 (as shown), there is activating at least one cycle of spring-type elastic reversible transitions (indicated by the double lined two directional arrow) between a contracted linear conformational state (A) and an expanded linear conformational state (B) of the substantially elastic molecular linker, ML.

As shown in FIG. 5, the synthetic molecular assembly, SMA, includes additional components: (v) two chemical connectors, CC and CC', for chemically connecting the body 86 (that is, the first molecular linker, ML) of the axial bidentate ligand, AL, to the body 96 of the second molecular linker, ML', and, to the complexing group, CG, respectively, and, (vi) three binding sites, BS, BS', and BS", located at the body 96 of the second molecular linker, ML', at the atom, M', and, at the complexing group, CG', respectively, for potentially binding these positions of the synthetic molecular assembly, SMA, to an external entity (not shown in FIG. 5) part of or separate from a more encompassing mechanism or device.

Transition (indicated by the double lined two directional arrow) from the contracted (A) to the expanded (B) linear conformational state, or, from the expanded (B) to the contracted (A) linear conformational state, of the first substantially elastic molecular linker, ML, is characterized by the previously defined parameter, the molecular linker inter-end effective distance change, $D_E$-$D_C$, or, $D_C$-$D_E$, respectively, indicating the sign, that is, positive or negative, respectively, and, the magnitude, of the change in the inter-end effective distance, D, between the two ends 88 and 90 of the molecular linker, ML, following the respective transition in linear conformational states, as indicated in FIG. 5.

It is especially noted that the term 'reversibly physicochemically paired' used for describing an axial ligand, AL, reversibly physicochemically paired with an atom, M, means that the axial ligand, AL, and the atom, M, are capable of reversibly physicochemically debonding or dissociating from each other, to a controllable extent or degree, and, bonding to, or associating with, each other, to a controllable extent or degree, following the activating mechanism, AM, sending an activating signal, AS/AS', to a predetermined atom-axial ligand pair, that is, to an atom-axial ligand 'bonded' pair, or, to an atom-axial ligand 'non-bonded' pair, for physicochemically modifying, that is, for 'debonding' the atom-axial ligand bonded pair, to a controllable extent or degree, or, for 'bonding' the atom-axial ligand non-bonded pair, to a controllable extent or degree, respectively, as illustrated by (A) and (B), respectively, in FIGS. 1-5.

It is this type of controllable reversible chemical debonding and bonding capability of the atom-axial ligand pair, initiated by controlled operation of the activating mechanism, AM, which provides the driving force for activating each cycle of spring-type elastic reversible transitions between contracted and expanded linear conformational states of a predetermined molecular linker, ML, of the synthetic molecular assembly, SMA, of the synthetic molecular spring device of the present invention.

Accordingly, for implementing the synthetic molecular spring device of the present invention, an operator operates and controls the activating mechanism, AM, for sending an activating signal, AS/AS', to 'either' the atom-axial ligand 'bonded' pair, or, to the atom-axial ligand 'non-bonded' pair, for physicochemically modifying, that is, for 'debonding' the atom-axial ligand bonded pair, to a controllable extent or degree, or, for 'bonding' the atom-axial ligand non-bonded pair, to a controllable extent or degree, respectively, thereby activating at least one cycle of spring-type elastic reversible transitions between contracted and expanded linear conformational states of a predetermined molecular linker, ML.

In the immediately preceding five exemplary preferred embodiments of the generalized synthetic molecular spring device, this type of controllable reversible debonding and bonding, or, bonding and debonding, process, is generally referred to along with use of the phrase 'activating at least one cycle of spring-type elastic reversible transitions between a contracted linear conformational state (A) and an expanded linear conformational state (B) of the molecular linker, where the linear conformational states (A) and (B) are appropriately illustrated in each accompanying drawing.

Following are further details describing function and structure, along with specific preferred categories and sub-categories of different types of each of the above indicated components of the synthetic molecular spring device of the present invention. The following details are applicable to the above described generalized synthetic molecular spring device, and, to each of the previously described five exemplary preferred embodiments of the synthetic molecular spring device, illustrated in FIGS. 1-5. For illustrative purposes, typically, function and structure are described below with reference to each single component, for example, the atom, M, the complexing group, CG, the axial ligand, AL, and, the molecular linker ML, of the synthetic molecular assembly, SMA, and, of the activating mechanism, AM, however, it is to be clearly understood that such description is extendable and applicable to embodiments of the synthetic molecular spring device of the present invention featuring a plurality of these single components.

The atom, M, which is complexed to the complexing group, CG, functions by being reversibly physicochemically paired, as described above, with the axial ligand, AL, thereby, forming the reversibly physicochemically paired atom-axial ligand pair, for example, atom-axial ligand pairs 12 and 14 (FIG. 1), 32, 34, and 36 (FIG. 2), 52 (FIG. 3), 62 and 64 (FIG. 4), and, 82 and 84 (FIG. 5).

In general, in each of the contracted linear conformational state (A) and the expanded linear conformational state (B), the nature of the relationship between the complexed atom, M, and the axial ligand, AL, varies from being a clearly defined chemical interaction or bond, such as a covalent, coordination, or, ionic, bond of varying degree or extent of covalency coordination, or, ionic strength, to being a pair of two non-interacting or non-bonding components, that is, the complexed atom, M, and the axial ligand, AL, located as neighbors in the same immediate vicinity within the synthetic molecular assembly, SMA.

In most cases, for example, as applicable to the previously described first four exemplary preferred embodiments of the synthetic molecular spring device, illustrated in FIGS. 1-4, in the contracted linear conformational state (A), the complexed atom, M, and the axial ligand, AL, are in the form of a chemical bond, such as a covalent, coordination, or, ionic, bond of varying degree or extent of covalency, coordination, or, ionic strength, whereas, in the expanded linear conformational state (B), the complexed atom, M, and the axial ligand, AL, are in the form of a pair of non-interacting or non-bonding components of the synthetic molecular assembly, SMA.

In some cases, however, for example, as applicable to the previously described fifth exemplary preferred embodiment of the synthetic molecular spring device, illustrated in FIG. 5, the opposite phenomenon takes place, whereby in the contracted linear conformational state (A), the complexed atom, M, and the axial ligand, AL, are in the form of a pair of non-interacting or non-bonding components of the synthetic molecular assembly, SMA, whereas, in the expanded linear conformational state (B), the complexed atom, M, and the axial ligand, AL, are in the form of a chemical bond, such as a covalent, coordination, or, ionic, bond of varying degree or extent of covalency, coordination, or, ionic strength.

In principle, the atom, M, which is complexed to the complexing group, CG, is at least one neutral atom or at least one positively charged atom (cation), capable of forming at least one additional chemical bond of varying degree or extent of covalency, coordination, or, ionic strength, with another component of the synthetic molecular assembly, SMA. In particular, the atom, M, is any neutral atom or positively charged atom (cation), of an element selected from the group consisting of metals, semi-metals, and, non-metals. Preferably, the atom, M, is a cation of an element selected from the group consisting of magnesium, chromium, manganese, iron, ruthenium, osmium, cobalt, rhodium, nickel, copper, zinc, silicon, and, titanium. More preferably, the atom, M, is a cation of a metallic element selected from the group consisting of magnesium, iron, nickel, cobalt, copper, and, zinc.

The complexing group, CG, complexed to the atom, M, primarily functions by locally positioning the atom, M, with respect to the overall structure of the synthetic molecular assembly, SMA, in general, and, with respect to the structure and position of a predetermined molecular linker, ML, in particular, which is activated for undergoing the spring-type elastic reversible transitions between contracted and expanded linear conformational states.

For example, with reference to FIG. 1, wherein the synthetic molecular spring device 10, the synthetic molecular assembly, SMA, includes two substantially elastic molecular linkers, ML and ML', each having a body, and, having two ends each chemically bonded to a single corresponding complexing group, CG and CG', respectively, in the particular case whereby the atom, M, is the same as the atom, M', being Co(II) metal cation, and, whereby the first complexing group, CG, is the same as the second complexing group, CG', being a porphyrin, the Co(II) cations are essentially confined to the porphyrin core. Each Co-Porphyrin complex is chemically connected, via covalent bonding, to both molecular linkers, ML and ML', thereby determining the relative positions of the Co(II) cations.

A second function of the complexing group, CG, is for tuning or adjusting the bonding/debonding energy of the atom-axial ligand pair. This tuning or adjusting function exists due to the fact that the bonding/debonding energy of the atom-axial ligand pair is related to the type, strength, and, physicochemical characteristics, of the complex between the atom, M, and the complexing group, CG. For example, the metal atom of a typical metal-porphyrin type of atom-complexing group complex usually has a higher binding energy to a particular axial ligand, specifically functioning as a sigma donor, when the porphyrin complexing group has electron withdrawing groups in peripheral meso-positions. For example, in meso-tetra (pentafluorophenyl) substituted porphyrin.

A third function of the complexing group, CG, is for tuning or adjusting the activation energy, necessarily contained in the activating signal, AS/AS', sent by the activating mechanism, AM, which is required for activating the spring-type elastic reversible transitions between the contracted linear conformational state (A) and the expanded linear conformational state (B) of the molecular linker, ML. For example, the redox potential, relating to the activation energy contained in the activating signal, AS/AS', sent by an electrochemical type of activating mechanism, AM, can be designed by selecting a complexing group, CG, skeleton and an atom, M, such that the complexing group, CG, can be a macrocyclic compound selected from the group consisting of porphyrins, substituted porphyrins, dihydroporphyrins, substituted dihydroporphyrins, tetrahydroporphyrins, and, substituted tetrahydroporphyrins. In this case, the degree of macrocycle saturation is increased, while maintaining the same additional substituting groups on the macrocycle used for creating chemical bonds, for example, to one or more molecular linkers, ML. Usually, the degree of macrocycle saturation has a major effect on redox potentials, and, therefore, on the activation energy contained in the activating signal, AS/AS', while conserving functional and structural characteristics and behavior of the synthetic molecular assembly, SMA.

In general, the complexing group, CG, is a chemical compound capable of complexing, via at least one chemical bond of varying degree or extent of covalency, coordination, or, ionic strength, the atom, M, and, has a variable geometrical configuration or form with variable dimensions and flexibility.

Preferably, the complexing group, CG, is a chemical compound selected from the group consisting of cyclic chemical compounds, polycyclic chemical compounds, noncyclic chemical compounds, linear chemical compounds, branched chemical compounds, and, combinations thereof.

In particular, as a cyclic chemical compound, the complexing group, CG, is selected from the group consisting of macroheterocyclic chemical compounds, and, macrocyclic chemical compounds. More specifically, as a macroheterocyclic chemical compound, the complexing group, CG, is selected from the group consisting of polyazamacrocycles, crown ethers, and, cryptates. More specifically, as a polyazamacrocycle type of chemical compound, the complexing group, CG, is selected from the group consisting of tetrapyrroles, and, phtalocyanines, and, naphthalocyanines. More specifically, as a tetrapyrrole type of chemical compound, the complexing group, CG, is selected from the group consisting of porphyrins, chlorines, bacteriochlorines, corroles, and, porphycens.

In particular, as a non-cyclic chemical compound, the complexing group, CG, is selected from the group consisting of open tetrapyrroles, for example, phycocyanobilin, and, phycoerythrobilin.

Preferably, the complexing group, CG, is a chemical compound which functions as a chemical chelator for chelating the atom, M, thereby forming a chelate with the atom, M. In this case, the chelate corresponds to a heterocyclic ring containing the atom, M, preferably, as a metal cation, attached by coordinate bonds to at least two nonmetal ions of the complexing group, CG.

The axial ligand, AL, primarily functions by being reversibly physicochemically paired with the atom, M, which is complexed to the complexing group, CG, as described above, thereby, forming the reversibly physicochemically paired atom-axial ligand pair.

A second function of the axial ligand, AL, is for chemically interacting with at least one other component, in addition to the complexed atom, M, of the synthetic molecular assembly, SMA. More specifically, the axial ligand, AL, secondarily functions by chemically interacting with at least one other component, in addition to the complexed atom, M, selected from the group consisting of an additional atom, M', the complexing group, CG, the molecular linker, ML, the optional chemical connector, CC, and, the optional binding site, BS, of the synthetic molecular assembly, SMA. In particular, the axial ligand, AL, is for inducing the reversible transitions between contracted and expanded linear conformational states of a predetermined molecular linker, ML, by producing at least one coordinative bonding interaction with an atom, M, and, at least one additional bonding interaction with with at least one other component of the synthetic molecular assembly, SMA.

As is well known in the art of ligand chemistry, an axial ligand may feature more than one type of region of physicochemical behavior. In the present invention, preferably, the axial ligand, AL, features at least two types of regions of physicochemical behavior. A first type of region of physicochemical behavior corresponds to that part of the axial ligand, AL, which participates in coordinative bonding interaction with the atom, M. A second type of region of physicochemical behavior corresponds to that part of the axial ligand, AL, connecting between either two first type of regions of the axial ligand, AL, or, connecting between a first type of region and another component of the synthetic molecular assembly, SMA.

In general, the first or second type of region of physicochemical behavior of the axial ligand, AL, may correspond to an 'end' or 'terminal' region of the axial ligand, AL, or, an 'intermediate' region of the axial ligand, AL. For example, in the particular case where the axial ligand; AL, is of a linear or branched geometrical configuration or form, the first or second type of region of physicochemical behavior of the axial ligand, AL, may correspond to an 'end' or 'terminal' region of the axial ligand, AL. In the particular case where the axial ligand, AL, is of a cyclic geometrical configuration or form, the first or second type of region of physicochemical behavior of the axial ligand, AL, necessarily corresponds to an 'intermediate' region of the axial ligand, AL, since, unless arbitrarily defined or assigned, a cyclic axial ligand has no 'end' or 'terminal' region.

A third function of the axial ligand, AL, is for tuning or adjusting the bonding/debonding energy of the atom-axial ligand pair. This tuning or adjusting function exists due to the fact that the bonding/debonding energy of the atom-axial ligand pair is directly related to the type, strength, and, physicochemical characteristics, of the axial ligand, AL, as well as those of the atom, M.

For illustrating this tuning or adjusting effect, calculations of the ligation energy, directly relating to the bonding energy, for bonding the axial ligand to the complex of the atom, M, and the complexing group, CG, being nickel-Bacteriocholrophyll, [Ni]-BChl, in the gas phase, were performed. The results are shown in the following table and details of the calculation procedure follow hereinafter. It is noted that the exemplary axial ligands used in the calculations and presented in the table are not necessarily axial ligands included in a particular synthetic molecular assembly, SMA.

| Axial Ligand | Ligation Energy [KCal/Mol] |
|---|---|
| Imidazole | −15.4 |
| Pyridine | −13.1 |
| 4-tert butyl pyridine | −13.8 |
| 3-Flouropyridine | −11.9 |

The conformational analyses of the molecular systems indicated in the table, including the structural and orbital arrangements as well as property calculations, were carried out using a variety of computational techniques for comparative purposes, using GAUSSIAN98. The hybrid density functional (HDFT) technique used is B3LYP, which employs the Lee-Yang-Parr correlation functional in conjunction with a hybrid exchange functional first proposed by Becke. The Hay and Wadt relativistic effective core potentials (RECP) were used for the transition metal. The specific effective core potential/basis set combination chosen was LANL2DZ (Los Alamos National Laboratory 2-double-ζ; the '2' indicating that the valence and 'valence-1' shells are treated explicitly). The LANL2DZ basis set is of double-ζ quality in the valence and 'valence-1' shells, whereas the RECP contains Darwin and mass-velocity contribution. For more accurate properties, fine-integration grid, tight single point property calculations were carried out using a larger basis set denoted LANL2DZ+1, which consists of the LANL2DZ basis set augmented with single f functions on Ni, and the standard Dunning's cc-pvdz (correlation consistent polarized valence double-ζ) basis set ([4s3p1d/3s2p1d/2s1p]) on first and second row atoms.

A fourth function of the axial ligand, AL, is for tuning or adjusting the activation energy, necessarily contained in the activating signal, AS/AS', sent by the activating mechanism, AM, which is required for activating the spring-type elastic reversible transitions between the contracted linear conformational state (A) and the expanded linear conformational state (B) of the molecular linker, ML.

For example, measurements of the spectroscopic electronic p-p* transition directly relating to the activation energy, needed for debonding the axial ligand from a complex of the atom, M, and the complexing group, CG, being nickel-Bacteriocholrophyll, [Ni]-BChl, in acetonitrile, were performed. The results are shown in the following table. It is noted that the exemplary axial ligands used in the calculations and presented in the table are not necessarily axial ligands included in a particular synthetic molecular assembly, SMA.

Change in the optical spectrum of [Ni]-BChl with different axial ligands, measured in acetonitrile.

Qy, Qx, Bx, and, By, in order of increasing energy, are the four observed spectroscopic electronic p-p* transitions for metal Bacteriocholrophylls. The DeltaQ in the table is relative to non axially ligated [Ni]-BChl.

A sixth, less critical, function of the axial ligand, AL, is for local positioning of the atom, M, in relation to the overall structure of the synthetic molecular assembly, SMA. For example, in some metal porphyrins, or phtalocyanines, when changing the coordination state of the atom, M, between tetra- and penta-, or, between hexa- and penta-, coordinated states, the atom, M, may change its position relative to the complexing group, CG, from an in-plane to an out-of-plane configuration.

In general, the axial ligand, AL, is a chemical compound capable of physicochemically interacting, via at least one chemical bond of varying degree or extent of covalency, coordination, or, ionic strength, with the atom, M, and, has a variable geometrical configuration or form with variable dimensions and flexibility. Additionally, the axial ligand, AL, is a chemical compound capable of chemically interacting with at least one other component, in addition to the complexed atom, M, of the synthetic molecular assembly, SMA, via at least one chemical bond of varying degree or extent of covalency, coordination, or, ionic strength. In general, the axial ligand, AL, is a type of ligand selected from the group consisting of monodentate ligands, bidentate ligands, tridentate ligands, and, multidentate ligands.

Preferably, the axial ligand, AL, is a chemical compound selected from the group consisting of anionic compounds, and, neutral compounds. Preferably, the axial ligand, AL, as a neutral compound, features an electron rich region or group, behaving as a Lewis acid.

In particular, as a neutral compound, the axial ligand, AL, is selected from the group consisting of heterocyclics, bridged heterocyclics, amines, ethers, alcohols, iso-cyanides, polyheterocyclics, amides, thiols, unsaturated compounds, alkylhalides, and, nitro compounds. For example, as a neutral compound, the axial ligand, AL, is selected from the group consisting of pyridine, imidazole, 4,4'bipyridine, and, 1,3-diaminopropane.

For example, as an anionic compound, the axial ligand, AL, is selected from the group consisting of cyanides, acids, carboxylic acids.

In a particular preferred embodiment of the present invention, the second type of region of physicochemical behavior of the axial ligand, AL, as described above, features spring-type elastic reversible function, structure, and behavior or characteristics, for example, as previously described above with respect to the fifth exemplary preferred embodiment of the synthetic molecular spring device, 80, as illustrated in

| Ligand | ΔQy [cm$^{-1}$] 1/2[a] | | ΔQx [cm$^{-1}$] 1/2 | | ΔBx [cm$^{-1}$] 1\|2 | | ΔBy [cm$^{-1}$] 1/2 | |
|---|---|---|---|---|---|---|---|---|
| 1-methylimidazole | 203.02 | 258.52 | −1278.20 | −2198.53 | 0 | 0 | −957.46 | −2260.28 |
| Pyridine | 269.20 | 285.24 | −1131.33 | −1990.63 | 0 | 0 | −1243.10 | −2155.60 |
| 4-picoline | 237.40 | 279.20 | −1169.91 | −2004.44 | 0 | 0 | −904.30 | −2184.50 |
| 4-aminopyridine | 237.91 | 271.78 | −1227.46 | −2150.22 | 0 | 0 | −1186.91 | −2325.12 |
| 3-Flouropyridine | 352.96 | 280.75 | −1059.96 | −1851.78 | 0 | 0 | −1157.51 | −2207.28 |
| Piperidine | 226.26 | 269.02 | −1260.70 | −2128.88 | 0 | 0 | −1093.60 | −2141.89 |
| Cyanide anion[b] | 205.75 | * | −1925.47 | * | 0 | 0 | −1744.47 | * |

[a]the notation 1/2 indicates one, or two axial ligands, respectively.
[b]with cyanide anion (CN−), only one axial ligand is bonded.

FIG. 5. In that particular exemplary preferred embodiment, the axial ligand, AL, is an axial bidentate ligand, AL, reversibly physicochemically paired with each of the two atoms M and M', whereby the body 86 of the axial bidentate ligand, AL, is a substantially elastic molecular linker, ML, having body 86, and, having two ends 88 and 90 each chemically bonded to a single end 92 and 94, respectively, of the axial bidentate ligand, AL.

For implementing the present invention, preferably, the rational used for designing the synthetic molecular assembly, SMA, by selecting a particular combination of an atom(s), M, a complexing group(s), CG, and, an axial ligand(s), AL, is based on the particular type of activating mechanism, AM, selected. For example, in the case where it is desired to have chemical control, such as via pH control, over the action of the synthetic molecular assembly, SMA, in general, while avoiding transition from the contracted to the expanded conformational states of the molecular linker, ML, in particular, upon photoexcitation, the synthetic molecular assembly, SMA, may be designed to include the following specific primary components: the atom, M, being Mg(II), the complexing group, CG, being a porphyrin derivative, and, the axial ligand, AL, being an alcohol.

The molecular linker, ML, primarily functions by being substantially elastic, having a body, and, having two ends with at least one end chemically bonded to another component of the synthetic molecular assembly, SMA.

Moreover, the substantially elastic functionality, along with an appropriate structure, of the molecular linker, ML, is critically important for implementing the main aspect of multi-parametric controllable spring-type elastic reversible function, structure, and behavior, of the synthetic molecular spring device of the present invention. Specifically, as previously described above, with reference to the five exemplary preferred embodiments of the synthetic molecular spring device, as illustrated in FIGS. 1-5, following the activating mechanism, AM, sending an activating signal, AS/AS', to at least one predetermined atom-axial ligand pair, for physicochemically modifying the at least one predetermined atom-axial ligand pair, there is activating at least one cycle of spring-type elastic reversible transitions between a contracted linear conformational state (A) and an expanded linear conformational state (B) of the molecular linker, ML.

The molecular linker, ML, is selected according to a desired extent or degree of elasticity needed for the synthetic molecular assembly, SMA, in particular, and, for the synthetic molecular spring device, in general, to exhibit the multi-parametric controllable spring-type elastic reversible function, structure, and behavior, operable in a wide variety of different environments. More specifically, the elasticity of the molecular linker, ML, is selected in order to produce a sufficient mechanical spring-type elastic reversible restoring force, according to use of the activating mechanism, AM, when a particular linear conformational state, expanded or contracted, of the molecular linker, ML, is transformed from one state to the other state.

A second function, related to the primary function, of the molecular linker, ML, is for serving as a physical geometrical linear spacer as part of designing and synthesizing the geometrical configuration or form and dimensions, with respect to the contracted and expanded linear conformational states of the synthetic molecular assembly, SMA. The molecular linker, ML, is the primary component of the synthetic molecular assembly, SMA, which determines the extent or degree of transition from the contracted to the expanded linear conformational state, or, from the expanded to the contracted linear conformational state. As previously described above, this extent or degree of transition is characterized by the parameter, the molecular linker inter-end effective distance change, $D_E$-$D_C$, or, $D_C$-$D_E$, respectively, indicating the sign, that is, positive or negative, respectively, and, the magnitude, of the change in the inter-end 'effective' distance, D, between the two ends of a single molecular linker, ML, or, between two arbitrarily selected ends of a plurality of molecular linkers, ML, included in a particular synthetic molecular assembly, SMA, following the respective transition in linear conformational states.

A third function of the molecular linker, ML, is for directing the resulting translational or linear movement during the transition in linear conformational states, according to a defined trajectory along at least one arbitrarily defined axis of the synthetic molecular assembly, SMA.

In general, the molecular linker, ML, is a chemical entity which is substantially elastic, having a body, and, having two ends with at least one end chemically bonded, via at least one chemical bond of varying degree or extent of covalency, coordination, or, ionic strength, to another component of the synthetic molecular assembly, SMA, and, has a variable geometrical configuration or form with variable dimensions and flexibility.

In particular, the molecular linker, ML, has at least one end chemically bonded to another component selected from the group consisting of the atom, M, the complexing group, CG, the axial ligand, AL, the optional chemical connector, CC, and, the optional binding site, BS, of the synthetic molecular assembly, SMA. Preferably, the molecular linker, ML, has two ends each chemically bonded to a single corresponding complexing group, CG, for example, as previously described with respect to the first and second exemplary preferred embodiments of the synthetic molecular spring device, 10 and 30, illustrated in FIGS. 1 and 2, respectively.

In general, the molecular linker, ML, is a chemical entity selected from the group consisting of an entity of at least two individual atoms, and, an entity of at least two molecules. Preferably, the molecular linker, ML, is a chemical entity featuring at least two atoms capable of physicochemically interacting, via at least one chemical bond of varying degree or extent of covalency, coordination, or, ionic strength, with each other, and, with at least one other component of the synthetic molecular assembly, SMA.

More preferably, the molecular linker, ML, is selected from the group consisting of molecular chains with variable length, branching, and, saturation; cyclic compounds with various mono-, di-, or poly-functional groups, aromatic compounds with various mono-, di-, or poly-functional groups, and, combinations thereof.

In particular, the molecular linker, ML, is a chemical compound selected from the group consisting of alkanes, alkenes, alkynes, substituted phenyls, alcohols, ethers, mono-(aryleneethynylene)s, oligo-(aryleneethynylene)s, poly-(aryleneethynylene)s, and, (phenyleneethynylene)s. A specific example of the molecular linker, ML, is a chemical compound selected from the group consisting of C2 alkynes, C4 alkynes, C6 alkynes, 1,4 substituted phenyls, 1,4-substituted bicyclo [2.2.2]octanes, and, diethers.

The activating mechanism, AM, functions by controllably activating the spring-type elastic reversible function, structure, and behavior, of the synthetic molecular assembly, SMA. Specifically, as previously described above, with reference to the five exemplary preferred embodiments of the synthetic molecular spring device, as illustrated in FIGS. 1-5, the activating mechanism, AM, operatively directed to at least one predetermined atom-axial ligand pair, sends an activating signal, AS/AS', to the at least one predetermined atom-axial ligand pair, for physicochemically modifying the at least one predetermined atom-axial ligand pair, thereby activating at least one cycle of spring-type elastic reversible transitions between a contracted linear conformational state (A) and an expanded linear conformational state (B) of the molecular linker, ML.

In principle, the activating mechanism, AM, is essentially any type of appropriately designed and constructed mechanism which is controllably operated by being operatively directed to at least one predetermined reversibly physicochemically paired, atom-axial ligand pair, for sending an activating signal, AS/AS', to the at least one predetermined atom-axial ligand pair, for example, atom-axial ligand pairs 12 and 14 (FIG. 1), 32, 34, and 36 (FIG. 2), 52 (FIG. 3), 62 and 64 (FIG. 4), and, 82 and 84 (FIG. 5), for physicochemically modifying the at least one predetermined atom-axial ligand pair, thereby activating at least one cycle of spring-type elastic reversible transitions between a contracted linear conformational state (A) and an expanded linear conformational state (B) of the molecular linker, ML. Preferably, the activating mechanism, AM, is operable and performs this function under variable operating conditions and in a variety of different environments.

As previously noted above, with respect to describing the structure and function of the generalized synthetic molecular spring device of the present invention, the activating signal has two controllable general complementary levels, each with defined amplitude and duration, that is, a first general complementary level, AS, and, a second general complementary level, AS'. The first general complementary level, AS, of the activating signal, AS/AS', is sent to the at least one predetermined atom-axial ligand pair for physicochemically modifying the atom-axial ligand pair, via a first direction of a reversible physicochemical mechanism consistent with the basis of operation of the activating mechanism, AM, whereby there is activating a spring-type elastic reversible transition from a contracted linear conformational state (A) to an expanded linear conformational state (B) of the at least one predetermined molecular linker, ML. The second general complementary level, AS', of the activating signal, AS/AS', allows the at least one predetermined molecular linker, ML, to return to contracted conformational state (A).

In alternative embodiments of the present invention, the physicochemical relationship between the atom-axial ligand pair and the molecular linker, ML, is opposite to that relationship described above, whereby the first general complementary level, AS, of the activating signal, AS/AS', allows the at least one predetermined molecular linker, ML, to return to contracted conformational state (A). The second general complementary level, AS', of the activating signal, AS/AS', is sent to the at least one predetermined atom-axial ligand pair for physicochemically modifying the atom-axial ligand pair, via a second direction of a reversible physicochemical mechanism consistent with the basis of operation of the activating mechanism, AM, whereby there is activating a spring-type elastic reversible transition from an expanded linear conformational state (B) to a contracted linear conformational state (A) of the at least one predetermined molecular linker, ML.

It is noted that, in order not to limit the meaning of the function of the activating signal of the activating mechanism, AM, in practice, with respect to terminology and notation, the two controllable general complementary levels, AS and AS', of the activating signal, AS/AS', are interchangeable, whereby, the activating signal, AS/AS', may be written as the activating signal, AS'/AS.

Moreover, as previously noted above, each general complementary level, AS and AS', or, AS' and AS, of the activating signal, AS/AS', or, AS'/AS, respectively, features at least one specific sub-level, preferably, a plurality of specific sub-levels, of magnitude, intensity, amplitude, or strength.

At any given instant of time, either of the two general complementary levels, AS and AS', of the activating signal, AS/AS', of the activating mechanism, AM, is controllably directed and sent to the at least one predetermined reversibly physicochemically paired, atom-axial ligand pair, in part, according to operating parameters of the activating mechanism, AM. Selected exemplary operating parameters of the activating mechanism, AM, are (1) magnitude, intensity, amplitude, or strength, (2) frequency, (3) time or duration, (4) repeat rate or periodicity, and, (5) switching rate, that is, switching from one, for example, the first, complementary level, AS, to another, for example, the second, complementary level, AS', or, vice versa, of the particular general complementary level of the activating signal directed and sent to the at least one predetermined reversibly physicochemically paired, atom-axial ligand pair.

In general, the activating mechanism, AM, is a mechanism which is operatively directed to a pair of chemical species, for sending an activating signal to the pair of chemical species, for physicochemically modifying the pair of chemical species. In the present invention, as previously described and illustrated above, such a pair of chemical species corresponds to the reversibly physicochemically paired atom-axial ligand pair, of the synthetic molecular assembly, SMA.

Preferably, the activating mechanism, AM, is a type of mechanism selected from the group consisting of electromagnetic mechanisms which send electromagnetic types of activating signals, electrical/electronic mechanisms which send electrical/electronic types of activating signals, chemical mechanisms which send chemical types of activating signals, electrochemical mechanisms which send electrochemical types of activating signals, magnetic mechanisms which send magnetic types of activating signals, acoustic mechanisms which send acoustic types of activating signals, photoacoustic mechanisms which send photoacoustic types of activating signals, and, combinations thereof which send combination types of activating signals.

An exemplary electromagnetic type of activating mechanism is selected from the group consisting of laser beam based activating mechanisms which send laser beam types of activating signals, maser beam based activating mechanisms which send maser beam types of activating signals, and, combinations thereof.

An exemplary electrical/electronic type of activating mechanism is selected from the group consisting of electrical current based activating mechanisms which send electrical current types of activating signals, bias voltage based activating mechanisms which send bias voltage types of activating signals, and, combinations thereof.

An exemplary chemical type of activating mechanism is selected from the group consisting of protonation-deprotonation based activating mechanisms which send protonation-deprotonation types of activating signals, pH change based activating mechanisms which send pH change types of activating signals, concentration change based activating mechanisms which send concentration change types of activating signals, and, combinations thereof.

An exemplary electrochemical type of activating mechanism is an reduction/oxidation based activating mechanism which generates and sends an reduction/oxidation type of activating signal.

For implementing the synthetic molecular spring device of the present invention, preferably, the specific type of activating mechanism, AM, used is selected, designed, and, operated, according to a specific type of synthetic molecular assembly, SMA, having specific types of interrelating components and characteristics thereof. More specifically, the primary components of the synthetic molecular assembly, SMA, used as a basis for determining the specific type of activating mechanism, AM, are the atom, M, the complexing group, CG, and, the axial ligand, AL. Aside from the general function and structure of the molecular linker, ML, in relation to the overall function and structure of the synthetic molecular assembly, SMA, in particular, and, in relation to the overall function and structure of the synthetic molecular spring device, in general, as previously described above, specific types and characteristics of the molecular linker, ML, are of secondary importance with respect to selecting, designing, and, operating, the activating mechanism, AM.

Figure 6:
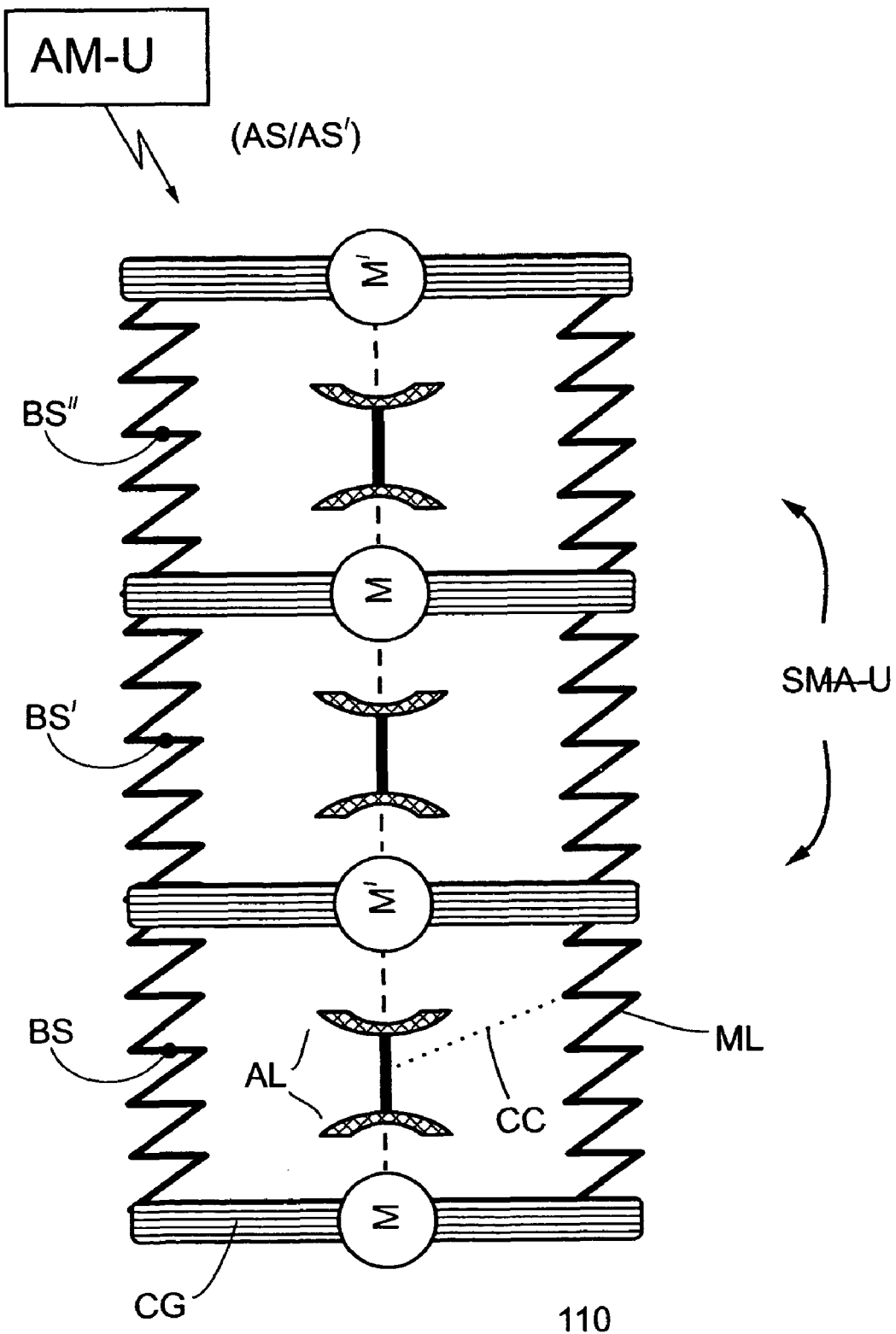
FIG. 6 is a schematic diagram illustrating a side view of a first exemplary preferred embodiment of a scaled-up synthetic molecular spring device, featuring a vertical configuration of a scaled-up synthetic molecular assembly, SMA-U, and, a scaled-up activating mechanism, AM-U, in accordance with the present invention.
Figure 7:
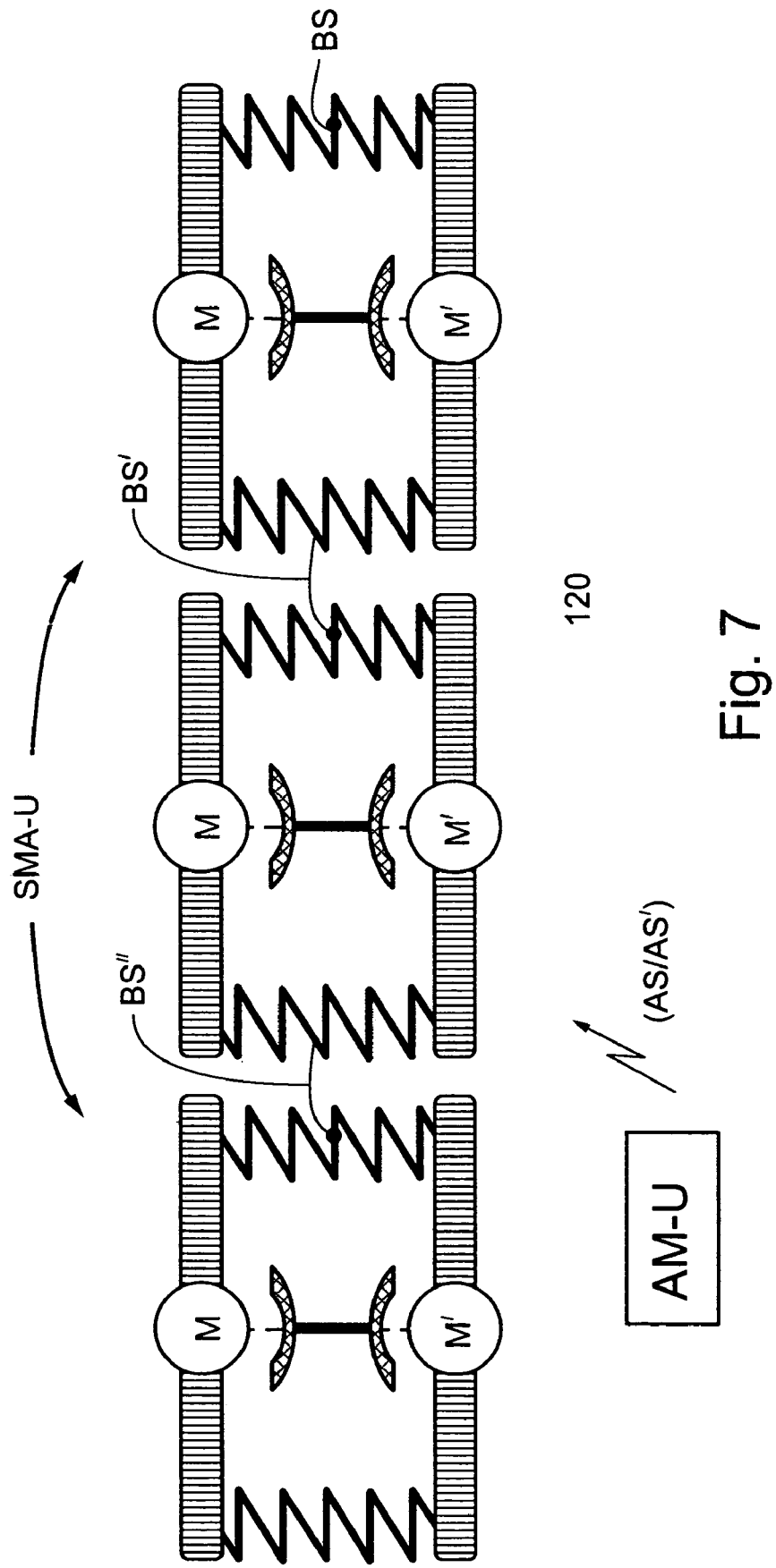
FIG. 7 is a schematic diagram illustrating a side view of a second exemplary preferred embodiment of a scaled-up synthetic molecular spring device, featuring a horizontal configuration of a scaled-up synthetic molecular assembly, SMA-U, and, a scaled-up activating mechanism, AM-U, in accordance with the present invention.

This secondary importance of the molecular linker, ML, with respect to selecting, designing, and, operating, the activating mechanism, AM, enables using a generally independent modular approach for designing and operating the synthetic molecular assembly, SMA, in particular, and, for designing and operating the synthetic molecular spring device, in general. More specifically, the same specific type of activating mechanism, AM, may be selected, designed, and, operated, for activating a synthetic molecular assembly, SMA, for example, a scaled-up synthetic molecular assembly, SMA-U, as illustrated in FIGS. 6-8 and described below with regard to modularity and scale up of the synthetic molecular spring device of the present invention, featuring a scaled-up plurality of chemical units or modules including different types of the molecular linker, ML, having variable geometrical configuration or form with variable dimensions and flexibility, for example, where the molecular linker, ML, is either long or short, flexible or rigid, in cases where the types and characteristics of the atom, M, the complexing group, CG, and, the axial ligand, AL, are identical or at least similar from module to module in the synthetic molecular assembly, SMA.

Alternatively, the present invention may be implemented whereby different specific types, for example, electromagnetic, electrochemical, and, chemical, types of the activating mechanism, AM, may be selected, designed, and, operated, for activating a synthetic molecular assembly, SMA, featuring the same primary components, that is, the same atom(s), M, complexing group(s), CG, axial ligand(s), AL, and, molecular linker(s), ML, as described herein below.

Selected details for implementing three different specific types of an activating mechanism, AM, included as part of the synthetic molecular spring device of the present invention, follow herein below. In each exemplary case, the synthetic molecular assembly, SMA, includes the atom, M, as a Ni(II) cation, the complexing group, CG, as a meso-substituted porphyrin derivative; the axial ligand, AL, as 4,4' Bipyridine, and, at least one substantially elastic molecular linker, ML, having a body, and, having two ends with at least one end chemically bonded to another component of the synthetic molecular assembly, SMA.

In the first exemplary case, there is implementing a laser beam based activating mechanism as an exemplary electromagnetic type of activating mechanism, AM. Photoinduced cation-axial ligand dissociation in nickel porphyrins usually involves ultrafast photoexcitation energy transfer from the lowest π-π* excited state of the macrocycle complexing group to the central Ni atom, thereby changing the electronic configuration of the complexing group from a high-spin ($^1d_{x^2-y^2}$, $^1d_{z^2}$) triplet state to a low-spin ($^2d_{z^2}$) singlet state.

In this case, the laser light wavelength is ideally selected such that it corresponds to the absorption maxima, typically, in the range of from about 350 nm to about 900 nm, for the complexing group, CG, atom, M, axial ligand, AL, complex, of the synthetic molecular assembly, SMA. More specifically, in the case of metal porphyrins, it is desired to have the laser light wavelength in the region of the Soret absorption band, typically, in the range of from about 380 nm to about 460 nm. This is achieved, for example, by using a picosecond diode laser, operating at a 40 MHz repetition rate, with an accuracy of plus/minus 3 nm rated at 420 nm wavelength.

Operatively directing the laser beam based activating mechanism to the cation-axial ligand pair, with a laser beam pulse functioning as the electromagnetic type of activating signal, AS, sent by the activating mechanism, AM, to the cation-axial ligand pair, physicochemically modifies the cation-axial ligand pair, via cation-axial ligand dissociation, as a result of the strong repulsion between the doubly occupied $d_{z^2}$ orbital and the electron density on the axial ligands. Cation-axial ligand dissociation is accompanied by activation of a spring-type elastic reversible transition from a contracted linear conformational state (A) to an expanded linear conformational state (B) of the molecular linker, ML. Following termination of the laser beam pulse directed at the cation-axial ligand pair, association of the axial ligand and the cation is accompanied by activation of a spring-type elastic reversible transition from the expanded linear conformational state (B) to the contracted linear conformational state (A) of the molecular linker, ML.

In the second exemplary case, there is implementing an reduction/oxidation based activating mechanism as an exemplary electrochemical type of activating mechanism, AM. Electroreduction in nickel porphyrins is usually metal-centered. Similar to the case of using the laser beam based activating mechanism described above, in this case, using an reduction/oxidation based activating mechanism also results in a ($^1d_{x^2-y^2}$, $^2d_{z^2}$) electronic configuration of the complexing group.

In this case, typical reduction potentials for metal porphyrins are in the range of from about −1.0 V to about −2.5 V vs. SCE (Saturated Calomel Reference Electrode). Typical oxidation potentials for metal porphyrins are in the range of from about +0.5 V to about +1.3 V vs. SCE. For electro-reduction/oxidation, an external voltage supply can be used, for example, as part of a standard electrochemical workstation with an appropriate cell configuration, as is well known in the art of electrochemistry. In particular, for example, a standard electrochemical workstation featuring a standard three-electrode setup, wherein the reference electrode may be Ag/Ag+ in an acetonitrile/N,N-dimethylformamide electrolyte solution. The working and counter electrodes can be Pt disks or Pt wires. The electrodes are electrically coupled to the synthetic molecular assembly, SMA, according to the specific mode of operation. It can be for example, the electrolyte solution, or any other medium that is capable of electrically coupling the synthetic molecular assembly, SMA, and the external voltage source.

Operatively directing the reduction/oxidation based activating mechanism to the cation-axial ligand pair, with the functioning as the electrochemical type of activating signal, AS, sent by the activating mechanism, AM, to the cation-axial ligand pair, physicochemically modifies the cation-axial ligand pair, via cation-axial ligand dissociation, as a result of the strong repulsion between the doubly occupied $d_{z^2}$ orbital and the electron density on the axial ligands. Cation-axial ligand dissociation is accompanied by activation of at least one cycle of spring-type elastic reversible transitions between a contracted linear conformational state (A) and an expanded linear conformational state (B) of the molecular linker, ML.

In the third exemplary case, there is implementing a protonation-deprotonation based activating mechanism as an exemplary chemical type of activating mechanism, AM. The bipyridine axial ligand acts as a Lewis base. The synthetic molecular assembly, SMA, is dissolved, or, bound to a surface that is immersed in acetonitrile solvent. An acidic solution of acetonitrile and a dilute aqueous solution of HCl/acidic acetonitrile solution is prepared. The acidic acetonitrile solution, functioning as the chemical type of activating signal, AS, is operatively directed and sent, for example, using a controllable solvent delivery setup, to the cation-axial ligand pair of the synthetic molecular assembly, SMA, located in the acetonitrile solvent environment. The acidic acetonitrile physicochemically modifies the cation-axial ligand pair, via protonation or acidification, whereby the nitrogen atoms of the bipyridine axial ligand, AL, are protonated, thereby loosing the ability to form coordinative bonds between the axial ligand, AL, and the nickel (II) cation, M. Disruption or breakage of the cation-axial ligand coordinative bond is accompanied by activation of a spring-type elastic reversible transition from a contracted linear conformational state (A) to an expanded linear conformational state (B) of the molecular linker, ML.

In order to restore the contracted linear conformational state (A) of the molecular linker, ML, in a similar, but complementary manner, basic solution of acetonitrile and dilute NaOH, functioning as the chemical type of activating signal, AS', is operatively directed and sent, using the controllable solvent delivery setup, to the acidified solution hosting the cation-axial ligand pair of the synthetic molecular assembly, SMA. The basic acetonitrile physicochemically modifies the cation-axial ligand pair, via deprotonation, whereby the protonated nitrogen atoms of the bipyridine axial ligand, AL, are deprotonated, thereby gaining the ability to form coordinative bonds between the axial ligand, AL, and the nickel (II) cation, M. Formation of the cation-axial ligand coordinative bond is accompanied by activation of a spring-type elastic reversible transition from the expanded linear conformational state (B) to the contracted linear conformational state (A) of the molecular linker, ML.

The chemical connector, CC, primarily functions by chemically connecting components of the synthetic molecular assembly, SMA, to each other.

A second function of the chemical connector, CC, is for providing additional structural constraint(s) with respect to another component of the synthetic molecular assembly, SMA. For example, in addition to being reversibly physicochemically paired with the atom, M, which is complexed to the complexing group, CG, as described above, and existing as part of the reversibly physicochemically paired atom-axial ligand pair, the axial ligand, AL, can be connected to the synthetic molecular assembly, SMA, via the chemical connector, CC.

In general, the chemical connector, CC, is a chemical entity capable of chemically connecting components of the synthetic molecular assembly, SMA, to each other, via chemical bonds of varying degree or extent of covalency, coordination, or, ionic strength, and, has a variable geometrical configuration or form with variable dimensions and flexibility. In general, the chemical connector, CC, is a chemical entity selected from the group consisting of atoms, and, molecules.

The binding site, BS, primarily functions by binding at least a part of the synthetic molecular assembly, SMA, to an external entity (not shown in the drawings) part of or separate from a more encompassing mechanism device.

A second function of the binding site, BS, is for providing directed modularity in the scale-up assembly of a 'poly-molecular' synthetic molecular assembly, SMA, featuring a plurality of chemical units or modules. By defining specific threading or linking possibilities, for example, according to a building block type of scaled-up assembly, it is possible to predetermine the type and configuration of connectivity, of a bottom-up self-assembly of large, poly-molecular structures of the synthetic molecular assembly, SMA, featuring a plurality of chemical units or modules.

A third function of the binding site, BS, is for providing recognition sites to the synthetic molecular assembly, SMA, in particular, and, to the synthetic molecular spring device, in general. For example, by using a binding site, BS, featuring one or more receptors for being recognized by specific antibodies.

In general, the binding site, BS, is a chemical entity which is chemically bonded, via at least one chemical bond of varying degree or extent of covalency, coordination, or, ionic strength, to at least one other component of the synthetic molecular assembly, SMA, and, has a variable geometrical configuration or form with variable dimensions and flexibility. More specifically, the binding site, BS, is a chemical entity selected from the group consisting of atoms, molecules, intervening spacer arms, bridging groups, carrier molecules, and, combinations thereof.

Modularity and Scale-Up

The synthetic molecular spring device of the present invention is scalable, due to the unitary or modular characteristic of the synthetic molecular assembly, SMA. This is an important characteristic of the present invention with respect to coupling and implementing the synthetic molecular spring device to the macroscopic world.

According to the description of the generalized synthetic molecular spring device of the present invention, the synthetic molecular assembly, SMA, features at least one chemical unit or module including: (i) at least one atom, M, (ii) at least one complexing group, CG, complexed to at least one atom, M, (iii) at least one axial ligand, AL, reversibly physicochemically paired with at least one atom, M, complexed to a complexing group CG, and, (iv) at least one substantially elastic molecular linker, ML, having a body, and, having two ends with at least one end chemically bonded to another component of the synthetic molecular assembly, SMA.

Moreover, the synthetic molecular assembly, SMA, optionally, includes additional components: (v) at least one chemical connector, CC, for chemically connecting components of the synthetic molecular assembly, SMA, to each other, and/or, (vi) at least one binding site, BS, each located at a predetermined position of another component of the synthetic molecular assembly, SMA, for potentially binding that position of the synthetic molecular assembly, SMA, to an external entity part of or separate from a more encompassing mechanism or device.

Accordingly, by definition, the synthetic molecular assembly, SMA, is scaled up by appropriately assembling and connecting a plurality of at least two of the above described chemical unit or module, whereby each chemical unit or module includes the above indicated components. Moreover, the synthetic molecular assembly, SMA, is scaled up for forming a variable geometrical configuration or form having variable dimensions and flexibility, for example, selected from the group consisting of a one-dimensional array, a two-dimensional array, a three-dimensional array, and, combinations thereof, of a plurality of the chemical units or modules.

In principle, a predetermined part, that is, a given number, of the connected units or modules of a scaled-up synthetic molecular assembly, herein referred to as SMA-U, functions as part of the scaled-up synthetic molecular assembly, and/or, as a connecting unit or module for connecting at least two other units or modules of the scaled-up synthetic molecular assembly, SMA-U, for example, as illustrated in FIGS. 6-8, indicated below. When incorporated as part of a one-dimensional, a two-dimensional, or, a three-dimensional, array, of a plurality of the chemical units or modules, each chemical unit or module of the scaled-up synthetic molecular assembly, SMA-U, retains its individual functionality and structure in addition to being functionally and structurally part of the scaled-up synthetic molecular assembly, SMA-U.

As part of the unitary or modular characteristic of the synthetic molecular assembly, SMA, functional and structural characteristics, that is, the multi-parametric controllable spring-type elastic reversible function, structure, and behavior, of the individual chemical units or modules may be either effectively linearly scaleable, or, synergistically scaleable, in accordance with the actual number and geometrical configuration or form of the plurality of the chemical units or modules of the scaled-up synthetic molecular assembly, SMA-U. Moreover, as part of scaling up the synthetic molecular spring device, in general, along with scaling up the synthetic molecular assembly, SMA, the other primary component of the synthetic molecular spring device, that is, the activating mechanism, AM, may also be correspondingly scaled up for forming a scaled-up activating mechanism, herein referred to as AM-U.

For example, a scaled-up synthetic molecular spring device, featuring a scaled-up synthetic molecular assembly, SMA-U, and, a scaled-up activating mechanism, AM-U, may be designed, constructed, and, operated, whereby the previously described parameter, that is, the molecular linker inter-end effective distance change, $D_E$-$D_C$, or, $D_C$-$D_E$, characterizing the extent or degree of transition in linear conformational states of one or more arbitrarily selected molecular linkers, ML, may also be scaled up for accounting for a plurality of extents or degrees of transitions in linear conformational states of a plurality of particular molecular linkers, ML, included in the scaled-up synthetic molecular assembly, SMA-U.

Illustrations of three different exemplary preferred embodiments of a scaled-up synthetic molecular spring device of the present invention, are indicated as follows. In each illustration, the scaled-up synthetic molecular assembly, SMA-U, features a plurality of synthetic molecular assemblies, each similar to the synthetic molecular assembly, SMA, of the synthetic molecular spring device 10, illustrated in FIG. 1, and previously described above. It is noted that, although not specifically shown in the following illustrations, the primary components, that is, the atoms, M, the complexing groups, CG, the axial ligands, AL, molecular linkers, ML, and, the optional additional components, that is, the chemical connectors, CC, and, the binding sites, BS, of a given synthetic molecular assembly, SMA, may be the same or vary within the same synthetic molecular assembly, SMA, and/or, may be the same or vary from one synthetic molecular assembly, SMA, to another synthetic molecular assembly, SMA, of a particular scaled-up synthetic molecular assembly, SMA-U.

FIG. 6 is a schematic diagram illustrating a side view of a first exemplary preferred embodiment of a scaled-up synthetic molecular spring device, 110, featuring a vertical configuration of a scaled-up synthetic molecular assembly, SMA-U, and, a scaled-up activating mechanism, AM-U.

FIG. 7 is a schematic diagram illustrating a side view of a second exemplary preferred embodiment of a scaled-up synthetic molecular spring device, 120, featuring a horizontal configuration of a scaled-up synthetic molecular assembly, SMA-U, and, a scaled-up activating mechanism, AM-U.

FIG. 8 is a schematic diagram illustrating a side view of a third exemplary preferred embodiment of a scaled-up synthetic molecular spring device, 130, featuring a two-dimensional array configuration of a scaled-up synthetic molecular assembly, SMA-U, and, a scaled-up activating mechanism, AM-U.

As clearly indicated by the immediately preceding description, functional and structural characteristics, that is, the multi-parametric controllable spring-type elastic reversible function, structure, and behavior, of the individual chemical units or modules are effectively linearly scaleable, in accordance with the actual number and geometrical configuration or form of the plurality of the chemical units or modules of the scaled-up synthetic molecular assembly, SMA-U. Accordingly, the detailed description above, relating to function and structure of each of the primary and optional components of the generalized synthetic molecular spring device, which are fully applicable to each of the previously described five exemplary preferred embodiments of the synthetic molecular spring device, illustrated in FIGS. 1-5, are also fully applicable to the just described scaled-up synthetic molecular spring device of the present invention, illustrated in FIGS. 6-8.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

While the invention has been described in conjunction with specific embodiments and examples thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A synthetic molecular spring device, comprising:
  (a) a synthetic molecular assembly having at least one chemical unit or module including:
    (i) at least one atom, each said atom is a cation of an element selected from the group consisting of magnesium, chromium, manganese, iron, ruthenium, osmium, cobalt, rhodium, nickel, copper, zinc, silicon, and, titanium;
    (ii) at least one complexing group complexed to at least one of said at least one atom, each said complexing group is a macrocyclic compound selected from the group consisting of porphyrins, dihydroporphyrins and tetrahydroporphyrins;

(iii) at least one axial ligand reversibly physicochemically paired with at least one said complexed atom via corresponding atom-axial ligand pairs, each said axial ligand is a heterocyclic compound selected from the group consisting of imidazole, pyridine, 4-tert butyl pyridine, 3-fluoropyridine, 1-methylimidazole, 4-picoline, 4-aminopyridine, piperidine and 4,4'-bipyridine; and (iv) at least one elastic molecular linker having a body and having two ends with at least one said end chemically bonded to another said component of said synthetic molecular assembly, each said elastic molecular linker is a chemical compound selected from the group consisting of alkanes, alkenes, alkynes, substituted phenyls, alcohols, ethers, (phenyleneethynylene)s, 1,4-substituted bicyclo[2.2.2]octanes, and, diethers; and (b) an activating mechanism operatively directed to at least one predetermined said atom-axial ligand pair, wherein following said activating mechanism sending an activating signal to said at least one predetermined atom-axial ligand pair for physicochemically modifying said at least one predetermined atom-axial ligand pair, there is activating at least one cycle of spring-type elastic reversible transitions between contracted and expanded linear conformational states, or, between said expanded and said contracted linear conformational states, of said at least one elastic molecular linker.

2. The device of claim 1, wherein nature of said reversible physicochemical pairing between a said complexed atom and a said axial ligand varies from being a chemical interaction or bond, to being a pair of two non-interacting or non-bonding components wherein said complexed atom and said axial ligand are located as neighbors in a same immediate vicinity within a said synthetic molecular assembly.

3. The device of claim 2, wherein said chemical interaction or bond is selected from the group consisting of a covalent bond, a coordination bond, and, an ionic bond.

4. The device of claim 1, wherein in a said contracted linear conformational state, nature of said reversible physicochemical pairing between a said complexed atom and a said axial ligand is a chemical bond, and in a said expanded linear conformational state, said nature of said reversible physicochemical pairing between said complexed atom and said axial ligand is a pair of two non-interacting or non-bonding components wherein said complexed atom and said axial ligand are located as neighbors in a same immediate vicinity within said synthetic molecular assembly.

5. The device of claim 1, wherein in a said contracted linear conformational state, nature of said reversible physicochemical pairing between a said complexed atom and a said axial ligand is a pair of two non-interacting or non-bonding components wherein said complexed atom and said axial ligand are located as neighbors in a same immediate vicinity within a said synthetic molecular assembly, and in a said expanded linear conformational state, said nature of said reversible physicochemical pairing between said complexed atom and said axial ligand is a chemical bond.

6. The device of claim 1, wherein a said complexed atom forms at least one additional chemical bond with another said component of a said synthetic molecular assembly.

7. The device of claim 1, wherein a said complexing group functions for locally positioning a said complexed atom of said complexing group in relation to overall structure of said synthetic molecular assembly.

8. The device of claim 1, wherein a said complexing group functions for locally positioning a said complexed atom of said complexing group in relation to structure and position of a said elastic molecular linker which is activated for undergoing said spring-type elastic reversible transitions between contracted and expanded linear conformational states.

9. The device of claim 1, wherein a said complexing group functions for tuning bonding and debonding energies of a said predetermined atom-axial ligand pair.

10. The device of claim 1, wherein a said complexing group functions for tuning activation energy required for activating said spring-type elastic reversible transitions between said contracted linear conformational state and said expanded linear conformational state of a said molecular linker.

11. The device of claim 1, wherein a said complexing group is a chemical compound functioning as a chemical chelator for chelating a said atom, thereby forming a chelate with said atom.

12. The device of claim 1, wherein a said axial ligand functions for chemically interacting with at least one other said component, in addition to a said complexed atom, of said synthetic molecular assembly.

13. The device of claim 1, wherein a said axial ligand functions for inducing said reversible transitions between said contracted and expanded linear conformational states of a said elastic molecular linker, by producing at least one coordinative bonding interaction with a said atom, and, at least one additional said bonding interaction with at least one other said component of said synthetic molecular assembly.

14. The device of claim 1, wherein a said axial ligand functions for tuning bonding and debonding energies of a said predetermined atom-axial ligand pair.

15. The device of claim 1, wherein a said axial ligand functions for tuning activation energy required for activating said spring-type elastic reversible transitions between said contracted linear conformational state and said expanded linear conformational state of a said molecular linker.

16. The device of claim 1, wherein a said axial ligand functions for locally positioning a said atom in relation to overall structure of said synthetic molecular assembly.

17. The device of claim 1, wherein a said heterocyclic axial ligand is a neutral compound selected from the group consisting of pyridine, imidazole, and 4,4' bipyridine.

18. The device of claim 1, wherein a said axial ligand features two types of regions of physicochemical behavior, wherein a first said type of region of physicochemical behavior corresponds to that part of said axial ligand which participates in coordinative bonding interaction with a said complexed atom, and wherein second said type of region of physicochemical behavior corresponds to that part of said axial ligand connecting between either two said first type of regions of said axial ligand, or connecting between a said first type of region and another said component of said synthetic molecular assembly.

19. The device of claim 18, wherein said second type of region of physicochemical behavior of said axial ligand features said spring-type elastic reversible function and behavior of a said elastic molecular linker.

20. The device of claim 1, wherein a said axial ligand is an axial bidentate ligand reversibly physicochemically paired with each of two said complexed atoms, wherein body of said axial bidentate ligand is a said elastic molecular linker having body and having each of two ends chemically bonded to a single end of said axial bidentate ligand.

21. The device of claim 1, wherein a said elastic molecular linker functions as a physical geometrical linear spacer of said synthetic molecular assembly, with respect to said contracted and expanded linear conformational states of said synthetic molecular assembly.

22. The device of claim 1, wherein a said elastic molecular linker functions for directing resulting translational or linear movement during said transition in linear conformational states, according to a defined trajectory along at least one arbitrarily defined axis of said synthetic molecular assembly.

23. The device of claim 1, wherein a said elastic molecular linker has at least one end chemically bonded to another said component of said synthetic molecular assembly, selected from the group consisting of a said atom, a said complexing group, and, a said axial ligand.

24. The device of claim 1, wherein a said elastic molecular linker has each of two ends chemically bonded to a different single said complexing group.

25. The device of claim 1, wherein a said elastic molecular linker is a chemical entity selected from the group consisting of at least two individual atoms, and, at least two molecules.

26. The device of claim 1, wherein said activating signal has two controllable general complementary levels, each with defined amplitude and duration.

27. The device of claim 26, wherein first said general complementary level of said activating signal is sent to said at least one predetermined atom-axial ligand pair for physicochemically modifying said atom-axial ligand pair, via a first direction of a reversible physicochemical mechanism consistent with operation of a corresponding said activating mechanism, wherein there is activating a said spring-type elastic reversible transition from a said contracted linear conformational state to a said expanded linear conformational state of said at least one elastic molecular linker, and, wherein said second general complementary level of said activating signal allows said at least one elastic molecular linker to return to a said contracted conformational state.

28. The device of claim 26, wherein first said general complementary level of said activating signal allows said at least one elastic molecular linker to return to a said contracted conformational state, and, wherein a second general complementary level of said activating signal is sent to said at least one predetermined atom-axial ligand pair for physicochemically modifying said atom-axial ligand pair, via a second direction of a reversible physicochemical mechanism consistent with operation of a corresponding said activating mechanism, wherein there is activating a said spring-type elastic reversible transition from a said expanded linear conformational state to a said contracted linear conformational state of said at least one elastic molecular linker.

29. The device of claim 26, wherein each said general complementary level of said activating signal features at least one specific sub-level having magnitude, intensity, amplitude, or strength.

30. The device of claim 26, wherein operating parameters of said activating mechanism are selected from the group consisting of: (1) magnitude, intensity, amplitude, or strength, (2) frequency, (3) time or duration, (4) repeat rate or periodicity, and (5) switching rate, of a said general complementary level of said activating signal sent to said at least one predetermined atom-axial ligand pair.

31. The device of claim 1, wherein said activating mechanism is a type of mechanism selected from the group consisting of electromagnetic mechanisms which send electromagnetic types of a said activating signal, electrical/electronic mechanisms which send electrical/electronic types of a said activating signal, chemical mechanisms which send chemical types of a said activating signal, electrochemical mechanisms which send electrochemical types of a said activating signal, magnetic mechanisms which send magnetic types of a said activating signal, acoustic mechanisms which send acoustic types of a said activating signal, photoacoustic mechanisms which send photoacoustic types of a said activating signal, and, combinations thereof which send combination types of a said activating signal.

32. The device of claim 1, wherein said activating mechanism is an electromagnetic type of activating mechanism selected from the group consisting of laser beam based activating mechanisms which send laser beam types of a said activating signals, maser beam based activating mechanisms which send maser beam types of a said activating signal, and, combinations thereof.

33. The device of claim 1, wherein said activating mechanism is an electrical/electronic type of activating mechanism selected from the group consisting of electrical current based activating mechanisms which send electrical current types of a said activating signal, bias voltage based activating mechanisms which send bias voltage types of a said activating signal, and, combinations thereof.

34. The device of claim 1, wherein said activating mechanism is a chemical type of activating mechanism selected from the group consisting of protonation-deprotonation based activating mechanisms which send protonation-deprotonation types of a said activating signal, pH change based activating mechanisms which send pH change types of a said activating signal, concentration change based activating mechanisms which send concentration change types of a said activating signal, and, combinations thereof.

35. The device of claim 1, wherein said activating mechanism is a reduction/oxidation based electrochemical type of activating mechanism which generates and sends a reduction/oxidation type of a said activating signal.

36. The device of claim 1, wherein specific type and operating parameters of said activating mechanism are selected according to physicochemical types and structures of said components of said synthetic molecular assembly.

37. The device of claim 1, wherein said activating mechanism is a laser beam based electromagnetic type of activating mechanism sending a an electromagnetic type of said activating signal as a laser light beam having a wavelength in a range of between about 350 nm to about 900 nm, for said physicochemically modifying at least one said predetermined atom-axial ligand pair of a said synthetic molecular assembly.

38. The device of claim 37, wherein said laser beam operates at a repetition rate in a range of between order of Hz to order of MHz.

39. The device of claim 37, wherein said laser beam operates at a repetition rate of 40 MHz.

40. The device of claim 1, wherein said activating mechanism is a reduction/oxidation based electrochemical type of activating mechanism, sending an electrochemical reduction type of said activating signal as a reduction potential in a range of from about −1.0 V to about −2.5 V vs. saturated calomel reference electrode, and sending an electrochemical oxidation type of said activating signal as an oxidation potential in a range of from about +0.5 V to about +1.3 V vs. said saturated calomel reference electrode, for said physicochemically modifying at least one said predetermined atom-axial ligand pair of a said synthetic molecular assembly.

41. The device of claim 1, wherein said activating mechanism is a protonation-deprotonation based chemical type of activating mechanism, sending a chemical protonation type of said activating signal as an acidic solution of acetonitrile and a dilute aqueous solution of HCl/acidic acetonitrile solution, and, sending a chemical deprotonation type of said activating signal as a basic solution of acetonitrile and dilute NaOH, for said physicochemically modifying at least one said predetermined atom-axial ligand pair of a said synthetic molecular assembly.

42. The device of claim 1, wherein a said chemical unit or module of said synthetic molecular assembly additionally includes: (v) at least one chemical connector for chemically connecting said components of said synthetic molecular assembly to each other.

43. The device of claim 42, wherein a said chemical connector functions for providing additional structural constraint with respect to another said component of said synthetic molecular assembly.

44. The device of claim 42, wherein a said chemical connector is a chemical entity selected from the group consisting of atoms, and, molecules.

45. The device of claim 1, wherein a said chemical unit or module of a said synthetic molecular assembly additionally includes: (vi) at least one binding site, each located at a predetermined position of another said component of said synthetic molecular assembly, for potentially binding each said position of said synthetic molecular assembly to an external entity.

46. The device of claim 45, wherein a said binding site functions for providing connectivity and directed modularity in a scaled-up assembly of a poly-molecular form of said synthetic molecular assembly featuring a plurality of said chemical units or modules chemically bound or connected to each other by a plurality of said binding sites.

47. The device of claim 45, wherein a said binding site functions for providing recognition sites to said synthetic molecular assembly.

48. The device of claim 45, wherein a said binding site functions for providing recognition sites to said synthetic molecular assembly, said binding site features at least one receptor for being recognized by at least one specific antibody.

49. The device of claim 45, wherein a said binding site is a chemical entity chemically bonded via at least one chemical bond of varying degree or extent of covalency, coordination, or, ionic strength, to at least one other said component of said synthetic molecular assembly, and, has a variable geometrical configuration or form with variable dimensions and flexibility.

50. The device of claim 1, wherein a said synthetic molecular assembly is a scaled-up synthetic molecular assembly, formed by assembling and connecting a plurality of at least two said chemical units or modules of a single said synthetic molecular assembly, wherein each said chemical unit or module of said scaled-up synthetic molecular assembly includes said components and exhibits functionality of a single said chemical unit or module.

51. The device of claim 50, wherein said scaled-up synthetic molecular assembly is of variable geometrical configuration or form selected from the group consisting of a one-dimensional array, a two-dimensional array, a three-dimensional array, and, combinations thereof, of said plurality of said chemical units or modules, and having variable dimensions and flexibility.

52. The device of claim 50, wherein each said chemical unit or module of said scaled-up synthetic molecular assembly retains individual functionality and structure in addition to being functionally and structurally part of said scaled-up synthetic molecular assembly.

53. The device of claim 50, wherein functional and structural characteristics relating to said spring-type elastic reversible function, structure, and behavior, of a said single chemical unit or module are scaleable in a manner selected from the group consisting of effectively linearly scaleable, and, synergistically scaleable, according to number and geometrical configuration or form of said plurality of said chemical units or modules of said scaled-up synthetic molecular assembly.

54. A synthetic molecular spring device, comprising:
(a) a synthetic molecular assembly having one chemical unit or module including:
  (i) two atoms, each said atom is a cation of an element selected from the group consisting of magnesium, chromium, manganese, iron, ruthenium, osmium, cobalt, rhodium, nickel, copper, zinc, silicon, and, titanium;
  (ii) two complexing groups, each said complexing group is a macrocyclic compound selected from the group consisting of porphyrins, dihydroporphyrins and tetrahydroporphyrins complexed to a corresponding atom;
  (iii) an axial bidentate ligand, being 4,4'-bipyridine, reversibly physicochemically paired with each of said two atoms via corresponding atom-axial ligand pairs, and,
  (iv) a first elastic molecular linker having a body, and, having two ends each chemically bonded to a single corresponding said complexing group, and, a second elastic molecular linker having a body, and, having two ends each chemically bonded to a single corresponding said complexing group, each said elastic molecular linker is a chemical compound selected from the group consisting of alkanes, alkenes, alkynes, substituted phenyls, alcohols, ethers, (phenyleneethynylene)s, 1,4-substituted bicyclo[2.2.2]octanes, and, diethers; and
(b) an activating mechanism operatively directed to at least one of said two atom-axial ligand pairs, wherein following said activating mechanism sending an activating signal to at least one of said two atom-axial ligand pairs for physicochemically modifying said at least one of said two atom-axial ligand pairs, there is activating at least one cycle of spring-type elastic reversible transitions between a contracted linear conformational state and an expanded linear conformational state, or, between said expanded and said contracted linear conformational states, of at least one said elastic molecular linker.

* * * * *